（12）United States Patent
Lee et al.

(10) Patent No.: US 10,572,080 B2
(45) Date of Patent: Feb. 25, 2020

(54) OPTICAL TOUCH FILM, DISPLAY DEVICE INCLUDING THE SAME, AND MANUFACTURING METHOD THEREOF

(71) Applicant: Samsung Display Co., Ltd., Yongin-si (KR)

(72) Inventors: In Nam Lee, Yongin-si (KR); Young Seok Yoo, Suwon-si (KR); Kang Won Lee, Seoul (KR); Hyun Jae Lee, Seoul (KR); Seung Hwan Chung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 197 days.

(21) Appl. No.: 15/619,840

(22) Filed: Jun. 12, 2017

(65) Prior Publication Data

US 2017/0357348 A1    Dec. 14, 2017

(30) Foreign Application Priority Data

Jun. 13, 2016    (KR) .................. 10-2016-0073183
May 30, 2017    (KR) .................. 10-2017-0066929

(51) Int. Cl.
| *G06F 3/044* | (2006.01) |
| *G06F 3/041* | (2006.01) |
| *G02B 1/14* | (2015.01) |
| *G02F 1/1333* | (2006.01) |

(52) U.S. Cl.
CPC .............. *G06F 3/044* (2013.01); *G02B 1/14* (2015.01); *G06F 3/0412* (2013.01); *G02F 1/13338* (2013.01); *G06F 2203/04102* (2013.01); *G06F 2203/04103* (2013.01); *G06F 2203/04111* (2013.01)

(58) Field of Classification Search
CPC .............. G06F 3/044; G06F 3/0412; G06F 2203/04111; G06F 2203/04102; G06F 2203/04103; G02B 1/14; G02F 1/13338
See application file for complete search history.

(56) References Cited

U.S. PATENT DOCUMENTS

| 2007/0264844 | A1 | 11/2007 | Hu |
| 2010/0141600 | A1 | 6/2010 | Park et al. |
| 2011/0115740 | A1* | 5/2011 | Qian ..................... G06F 3/045 345/174 |
| 2013/0016047 | A1 | 1/2013 | Masumoto |

(Continued)

FOREIGN PATENT DOCUMENTS

| KR | 10-1114646 | 3/2012 |
| KR | 10-2013-0009589 | 1/2013 |

(Continued)

*Primary Examiner* — Vinh T Lam
(74) *Attorney, Agent, or Firm* — H.C. Park & Associates, PLC

(57) ABSTRACT

An optical touch film includes a sensor layer, an optical film, an adhesive layer, a separation layer, and a refractive insulating layer. The sensor layer includes touch electrodes forming a sensor. The adhesive layer is between the sensor layer and the optical film. The separation layer is on a surface of the sensor layer. The separation layer includes an organic polymer material. The refractive insulating layer is on the touch electrodes. A refractive index of the refractive insulating layer is greater than a refractive index of the separation layer.

33 Claims, 30 Drawing Sheets

(56) References Cited

U.S. PATENT DOCUMENTS

| | | | |
|---|---|---|---|
| 2014/0327841 A1* | 11/2014 | Shin | H01L 27/323 |
| | | | 349/12 |
| 2015/0029143 A1 | 1/2015 | Kang et al. | |
| 2015/0286314 A1* | 10/2015 | Cheong | G06F 3/044 |
| | | | 345/174 |
| 2015/0301667 A1 | 10/2015 | Yano et al. | |
| 2016/0147346 A1 | 5/2016 | Lee et al. | |
| 2016/0170540 A1* | 6/2016 | Yang | G06F 3/0412 |
| | | | 345/173 |
| 2016/0306474 A1 | 10/2016 | Cho et al. | |
| 2016/0320885 A1* | 11/2016 | Kim | G06F 3/0412 |
| 2017/0277303 A1* | 9/2017 | Chen | G06F 3/044 |
| 2017/0329437 A1* | 11/2017 | Han | G06F 3/044 |
| 2018/0081470 A1* | 3/2018 | Li | G06F 3/044 |
| 2018/0120607 A1* | 5/2018 | Li | G02F 1/1343 |
| 2018/0150153 A1* | 5/2018 | Yoon | G06F 3/041 |
| 2018/0224983 A1* | 8/2018 | Zhang | G06F 3/041 |

FOREIGN PATENT DOCUMENTS

| | | |
|---|---|---|
| KR | 10-1252276 | 4/2013 |
| KR | 10-2014-0025230 | 3/2014 |
| KR | 10-2015-0012389 | 2/2015 |
| KR | 10-2015-0046809 | 5/2015 |
| KR | 10-1521775 | 5/2015 |
| KR | 10-1586736 | 1/2016 |
| KR | 10-1586739 | 1/2016 |
| KR | 10-1586740 | 1/2016 |
| KR | 10-1589863 | 1/2016 |
| KR | 10-2016-0063485 | 6/2016 |
| KR | 10-2016-0122896 | 10/2016 |
| KR | 10-2014-0097661 | 8/2017 |

\* cited by examiner

OPTICAL TOUCH FILM, DISPLAY DEVICE INCLUDING THE SAME, AND MANUFACTURING METHOD THEREOF

CROSS-REFERENCE TO RELATED APPLICATIONS

This application claims priority from and the benefit of Korean Patent Application No. 10-2016-0073183, filed Jun. 13, 2016, and Korean Patent Application No. 10-2017-0066929, filed May 30, 2017, each of which is hereby incorporated by reference for all purposes as if fully set forth herein.

BACKGROUND

Field

The disclosure generally relates to an optical touch film, a display device including the same, and a manufacturing method thereof.

Discussion

A display device, such as a liquid crystal display (LCD) and an organic light emitting diode (OLED) display, typically includes a pixel electrode and an electro-optical active layer. For example, an OLED display may include an organic emission layer as the electro-optical active layer, and an LCD may include a liquid crystal layer as the electro-optical active layer. The pixel electrode can be connected to a switching element, such as a thin film transistor, to be applied with a data signal, and the electro-optical active layer can convert the data signal into an optical signal to display an image.

A display device may also include a sensing function for enabling interactions with a user in addition to a function of displaying an image. The sensing function is a function that may determine whether an object approaches or contacts a screen of the display device, and can provide contact information about a contact position, etc., by detecting a change in pressure, charge, acoustics, or light that are applied to a screen when a user approaches or contacts the screen with a finger, a touch pen, etc., to input characters, draw pictures, and/or otherwise interact with the display device. The display device may receive an image signal to display an image based on the contact information.

A sensing function may be realized through a sensor. The sensor may be classified according to various methods, such as a resistive type, a capacitive type, an electro-magnetic (EM) type, an acoustic type, an optical type, etc. Among these methods, a capacitive type of sensor typically includes a plurality of touch electrodes to transmit a detection signal. A touch electrode may form a sensing capacitor alone or with an adjacent touch electrode. If a conductor, such as a finger, approaches or comes in contact with the sensor (or the screen of the display device), a change in capacitance is generated by the detection capacitor or a change in a charged amount, thereby enabling a contact existence and a contact position to be determined.

A plurality of touch electrodes may be disposed at a touch sensing region of a display device in which the contact can be sensed, and may be connected to a plurality of signal transmitting wires transmitting a detection signal. A sensor may be formed inside the display device (e.g., an in-cell type sensor), or may be formed directly on an outside surface of the display device (e.g., an on-cell type sensor). As another example, a separate touch sensor unit (or module) may be attached to the display device (e.g., an add-on cell type sensor). A touch-sensitive flexible display device usually includes a film with a sensor, and the film is typically attached to a display panel of the flexible display device in the add-on cell type manner.

The above information disclosed in this section is only for enhancement of an understanding of the background of the inventive concepts, and, therefore, it may contain information that does not form prior art already known to a person of ordinary skill in the art.

SUMMARY

Some exemplary embodiments are capable of reducing a thickness and a manufacturing cost of a display device including a sensing function. It is also noted that some exemplary embodiments are also capable of improving optical characteristics (e.g., increasing transmittance, reducing color change or shift, and/or the like) of the display device.

Additional aspects will be set forth in the detailed description which follows, and, in part, will be apparent from the disclosure, or may be learned by practice of the inventive concepts.

According to some exemplary embodiments, an optical touch film includes a sensor layer, an optical film, a curing-type adhesive layer, a separation layer, and a refractive insulating layer. The sensor layer includes touch electrodes forming a sensor. The curing-type adhesive layer is between the sensor layer and the optical film. The separation layer is on a surface of the sensor layer. The separation layer includes an organic polymer material. The refractive insulating layer is at a layer contacting the touch electrodes. A refractive index of the refractive insulating layer is greater than a refractive index of the separation layer.

According to some exemplary embodiments, a display device includes a display panel and an optical touch film. The optical touch film includes a sensor layer, an optical film, a curing-type adhesive layer, a separation layer, and a refractive insulating layer. The sensor layer includes touch electrodes forming a sensor. The curing-type adhesive layer is between the sensor layer and the optical film. The separation layer is on a surface of the sensor layer. The separation layer includes an organic polymer material. The refractive insulating layer is at a layer contacting the touch electrodes. A refractive index of the refractive insulating layer is greater than a refractive index of the separation layer.

According to some exemplary embodiments, a method of manufacturing a display device includes coating a separation layer including an organic polymer material on a carrier substrate; forming a sensor layer on the separation layer; separating the sensor layer and the separation layer from the carrier substrate; and curing an adhesive layer between the sensor layer and an optical film. The sensor layer includes touch electrodes and a refractive insulating layer contacting the touch electrodes. A refractive index of the refractive insulating is greater than a refractive index of the separation layer.

According to some exemplary embodiments, an optical touch film includes a sensor layer, an optical film, an adhesive layer, a separation layer, and a refractive insulating layer. The sensor layer includes touch electrodes forming a sensor. The optical film is on the sensor layer. The adhesive layer is between the sensor layer and the optical film. The separation layer is on a surface of the sensor layer. The separation layer includes an organic polymer material. The refractive insulating layer is on the touch electrodes. A refractive index of the refractive insulating layer is greater than a refractive index of the separation layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
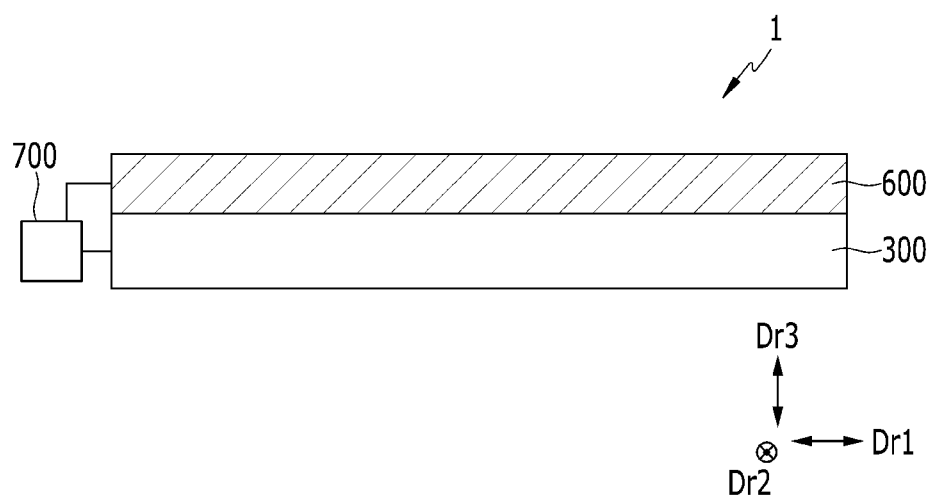
FIG. 1 is a schematic cross-sectional view of a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be implemented in another exemplary embodiment without departing from the spirit and the scope of the disclosure.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as "elements"), of the various illustrations may be otherwise combined, separated, interchanged, and/or rearranged without departing from the disclosed exemplary embodiments.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Further, the Dr1-axis, the Dr2-axis, and the Dr3-axis are not limited to three axes of a rectangular coordinate system, and may be interpreted in a broader sense. For example, the Dr1-axis, the Dr2-axis, and the Dr3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings are schematic in nature and shapes of these regions may not illustrate the actual shapes of regions of a device, and, as such, are not intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the spirit and scope of the inventive concepts. Further, the blocks, units, and/or modules of some exemplary embodiments may be physically combined into more complex blocks, units, and/or modules without departing from the spirit and scope of the inventive concepts Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein. As used herein, the phrase "on a plane" means viewing an object portion from the top, and the phrase "on a cross-section" means viewing a cross-section of a vertically cut object portion from a side.

A display device according to some exemplary embodiments will now be described with reference to FIGS. 1 through 5.

Figure 2:
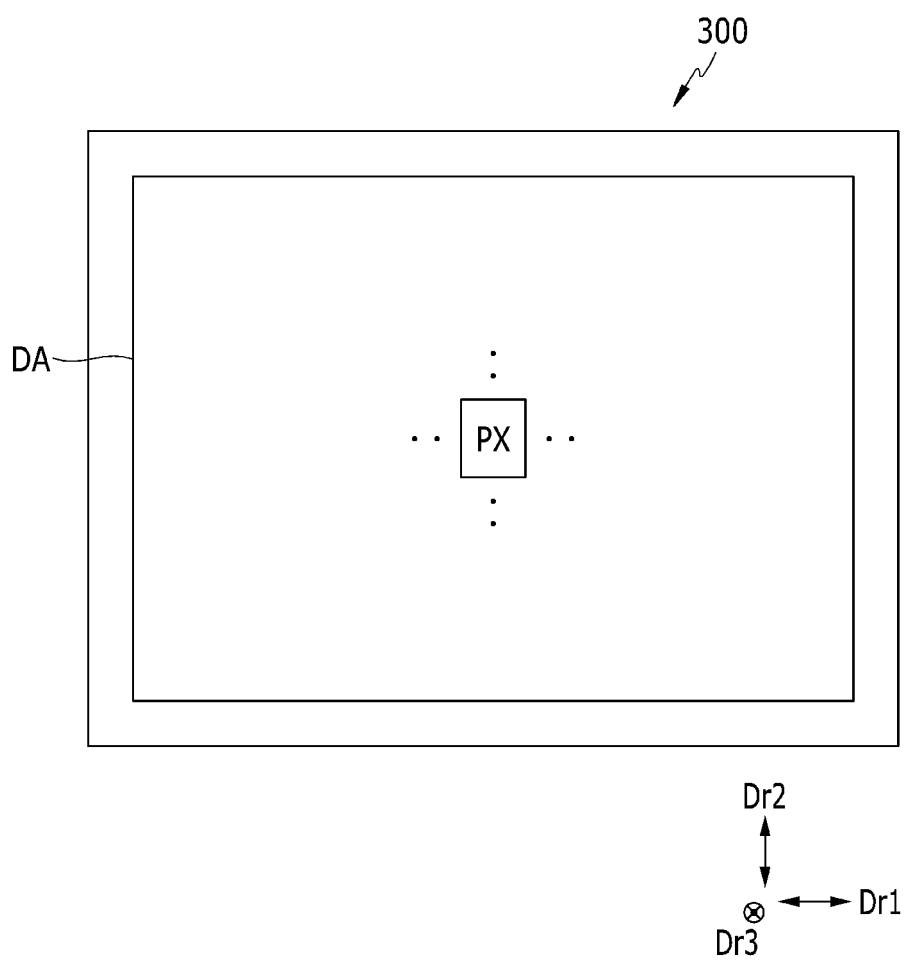
FIG. 2 is a schematic plan view of a display panel of a display device according to some exemplary embodiments.
Figure 3:
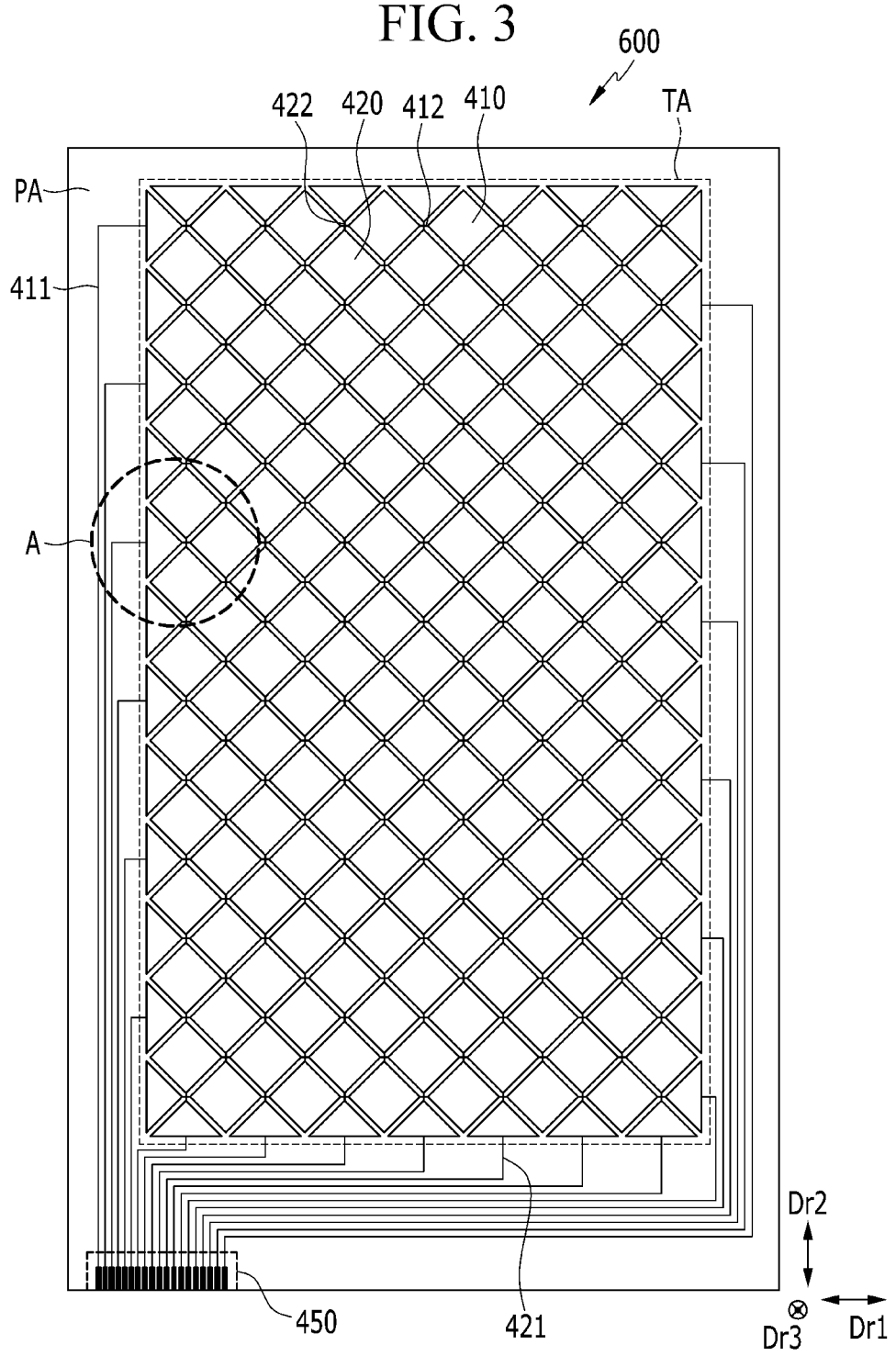
FIG. 3 is a schematic plan view of an optical touch film included in a display device according to some exemplary embodiments.
Figure 4:
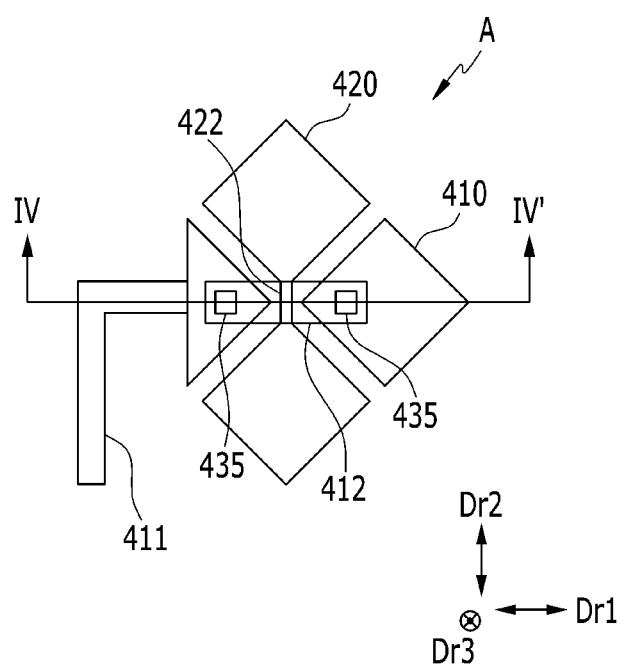
FIG. 4 is an enlarged view of a portion of the optical touch film of FIG. 3 according to some exemplary embodiments.

FIG. 1 is a schematic cross-sectional view of a display device according to some exemplary embodiments. FIG. 2 is a schematic plan view of a display panel of a display device according to some exemplary embodiments. FIG. 3 is a schematic plan view of an optical touch film included in a display device according to some exemplary embodiments. FIG. 4 is an enlarged view of a portion of the optical touch film of FIG. 3 according to some exemplary embodiments.

Figure 5:
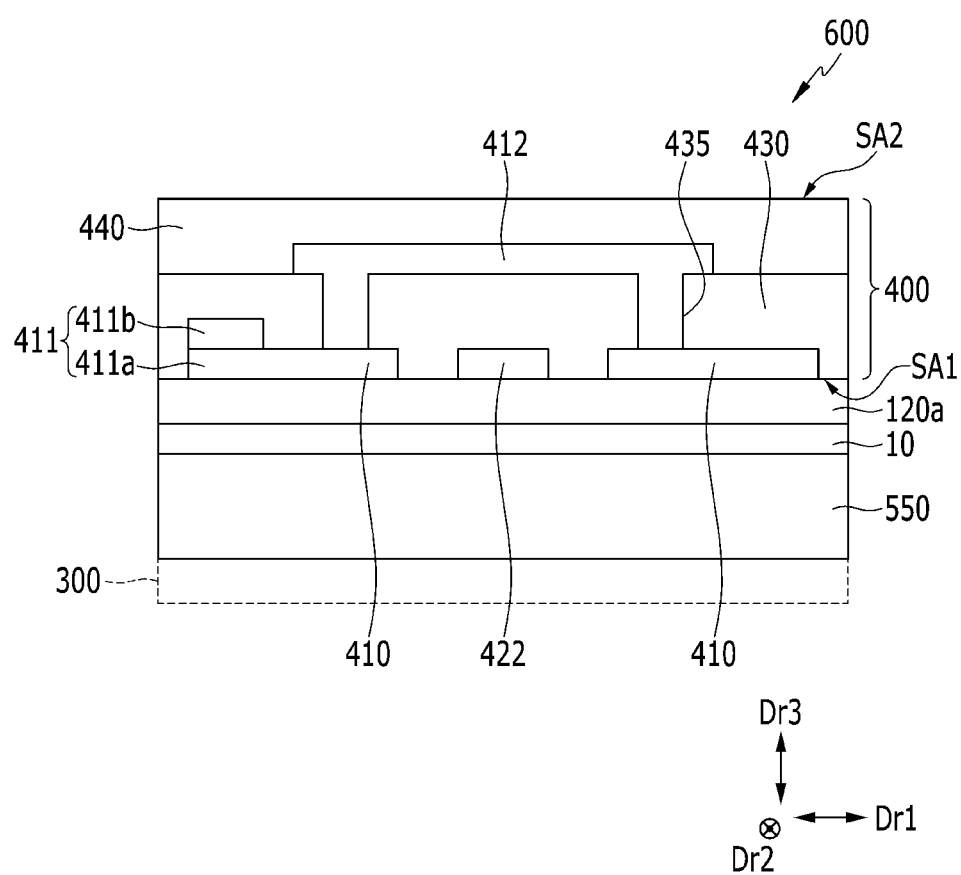
FIG. 5 is a cross-sectional view of the optical touch film of FIG. 4 taken along sectional line IV-IV' according to some exemplary embodiments.

FIG. 5 is a cross-sectional view of the optical touch film of FIG. 4 taken along sectional line IV-IV' according to some exemplary embodiments.

Display device 1 is a display device having a sensing function that can enable the sensation (or detection) of a user interaction, such as an external touch. The display device 1 includes a display panel 300 to display an image, an optical touch film 600, and a controller 700.

The display panel 300 and the optical touch film 600 may have a main surface extending on a plane parallel to a first direction Dr1 and a second direction Dr2. The main surface of the display panel 300 and the optical touch film 600 may be observed when viewed in a third direction Dr3 perpendicular to the first direction Dr1 and the second direction Dr2. At least part of the display panel 300 and the optical touch film 600 may be flexible, and, thereby, deformable, such as by bending, curving, or rolling.

Referring to FIG. 1, the display panel 300 and the optical touch film 600 may be disposed to be close in a direction parallel to the third direction Dr3. The optical touch film 600 may be attached on the display panel 300 in the third direction Dr3.

Referring to FIG. 2, the display panel 300 includes a display area DA in which a plurality of pixels PX (each pixel PX being a unit to display an image) is positioned. The display panel 300 may include a display element of at least one structure, such as a liquid crystal panel including a liquid crystal layer (not shown), an organic light emitting panel including an organic light emitting element (not illustrated), etc.

Referring to FIG. 5, when viewing a cross-sectional structure, the optical touch film 600 may include an optical film 550, a sensor layer 400, an adhesive layer 10, and a separation layer 120a. The adhesive layer 10 may be positioned between the optical film 550 and the sensor layer 400. The separation layer 120a may be positioned at any surface of the sensor layer 400. FIG. 5 shows an example in which the adhesive layer 10 and the separation layer 120a are in contact with each other. Further, according to some exemplary embodiments, the optical film 550 may be positioned between the sensor layer 400 and the display panel 300, but exemplary embodiments are not limited thereto or thereby. For instance, the sensor layer 400 may be disposed between the display panel 300 and the optical film 550.

An exemplary structure of the sensor layer 400 will be described in more detail with reference to FIGS. 3 to 5.

Referring to FIG. 3, the sensor layer 400 of the optical touch film 600 may include a touch area TA and a peripheral area PA on a plane.

The touch area TA as an area that is capable of sensing a touch of an external object. The touch area TA may correspond to and overlap the display area DA of the display panel 300. Here, the touch of the external object includes a case in which the external object approaches the display device 1 or hovers in an approached state, as well as a case in which the external object, such as a finger of a user, contacts the display device 1 in the touch area TA. For descriptive convenience, exemplary embodiments will be described in association with cases in which the external object contacts the display device 1 in the touch area TA.

A sensor that is capable of sensing the contact is positioned in the touch area TA. The sensor may sense the contact in at least one of various schemes. For example, the sensor may be a sensor of a resistive type, a capacitive type, an electro-magnetic (EM) type, an acoustic type, and/or an optical type. For descriptive convenience, the structure of a capacitive type sensor, and, more particularly, a sensor of a mutual capacitive type will be described in more detail in association with exemplary embodiments.

Referring to FIG. 3, the sensor may include a plurality of touch electrodes. In the case of a sensor of a mutual capacitive type, the plurality of touch electrodes may include a plurality of first touch electrodes 410 and a plurality of second touch electrodes 420 that are separated from each other.

The first touch electrodes 410 and the second touch electrodes 420 are alternately dispersed in the touch area TA to not substantially overlap each other, as will become more apparent below. The first touch electrodes 410 may be disposed according to a column direction and a row direction, and the second touch electrodes 420 may also be disposed according to the column direction and the row direction. The first touch electrodes 410 and the second touch electrodes 420 may be substantially positioned at the same layer; however, exemplary embodiments are not limited thereto or thereby.

First touch electrodes 410 arranged in the same column or row may be connected to each other or may be separated from each other inside or outside the touch area TA. At least portions of second touch electrodes 420 arranged in the same column or row may be connected to each other or may be separated from each other inside or outside the touch area TA. For example, as shown in FIG. 3, first touch electrodes 410 disposed in the same row may be connected in the touch area TA, and second touch electrodes 420 disposed in the same column may be connected to each other in the touch area TA.

According to some exemplary embodiments, first touch electrodes 410 positioned in each row may be connected to each other through a first connection part 412, and second touch electrodes 420 positioned in each column may be connected to each other through a second connection part 422.

Referring to FIGS. 3 to 5, the second connection part 422 connecting adjacent second touch electrodes 420 may be positioned in the same layer as the second touch electrodes 420, and may include the same material as the second touch electrodes 420. That is, the second touch electrodes 420 and the second connection part 422 may be integral and may be simultaneously patterned in a manufacturing process. The first connection part 412 connecting adjacent first touch electrodes 410 may be positioned at a different layer from the first touch electrodes 410. That is, the first touch electrodes 410 and the first connection part 412 may be separately formed in different processes.

According to some exemplary embodiments, the first connection part 412 and the first touch electrodes 410 may be positioned at the same layer and may be integrally formed with one another, and the second connection part 422 may be positioned at a different layer from the second touch electrodes 420.

A first insulating layer 430 is positioned between the first connection part 412 and the second connection part 422, and insulates the first connection part 412 and the second connection part 422 from each other. The first insulating layer 430 may include contact holes 435 respectively exposing the adjacent first touch electrodes 410 to connect the first connection part 412 to the adjacent first touch electrodes 410.

Referring to FIG. 3, the first touch electrodes 410 of each row may be connected to a pad part 450 in the peripheral area PA through first touch wires 411, and the second touch electrodes 420 of each column may be connected to the pad part 450 in the peripheral area PA through second touch wires 421. In some exemplary embodiments, at least part of the first touch wires 411 and the second touch wires 421 may be positioned in the touch area TA.

The first touch electrodes 410 and the second touch electrodes 420 may have a determined transmittance or more so that light may be transmitted. For example, the first touch electrodes 410 and the second touch electrodes 420 may be made of a transparent conductive material, such as indium tin oxide (ITO), indium zinc oxide (IZO), a thin metal layer like silver nanowire (AgNW), metal mesh, carbon nanotube (CNT), and a conductive polymer.

The first touch wires 411 and the second touch wires 421 may include the transparent conductive material included in the first touch electrodes 410 and the second touch electrodes 420, and may further include a relatively low resistance material, such as molybdenum (Mo), silver (Ag), titanium (Ti), copper (Cu), and/or aluminum (Al). In some exemplary embodiments, the first touch wires 410 and the second touch wires 420 may have a multilayer structure of one or more of the aforementioned materials, such as a multilayer structure of molybdenum/aluminum/molybdenum (Mo/Al/Mo). FIG. 5 shows an example in which the first touch wires 411 include a first conductive layer 411a and a second conductive layer 411b that are deposited on one another with respect to the third direction Dr3. It is noted that the structure of the first touch wires 411 illustrated in FIG. 5 may be applied in association with the second touch wires 421. The first conductive layer 411a may be positioned at the same layer as the first touch electrodes 410, and may include the same material as the first touch electrodes 410. The second conductive layer 411b may be positioned on the first conductive layer 411a and may include the low resistance material, such as a metal.

The first touch electrodes 410 and the second touch electrodes 420 adjacent to each other form a mutual sensing capacitor that functions as the sensor. The mutual sensing capacitor may receive a sensing input signal through one touch electrode of the first touch electrodes 410 and the second touch electrodes 420, and may output a change in a charge amount associated with a contact of the external object as a sensing output signal through the other touch electrode of the first touch electrodes 410 and the second touch electrodes 420.

Different from FIGS. 3 and 4, a plurality of first touch electrodes 410 and a plurality of second touch electrodes 420 may be respectively connected to touch wiring (not shown). In this case, each touch electrode may form a self-sensing capacitance that functions as the sensor. The self-sensing capacitor may be charged with a determined charge amount by receiving the sensing input signal, and in response to the contact of the external object, such as a finger, a change in the charge amount can be generated and the sensing output signal that is different from the input sensing input signal may be output to, for instance, the controller 700.

Referring to FIG. 5, the sensor layer 400 may further include a second insulating layer 440 positioned on the first connection part 412 and the first insulating layer 430. In this manner, a main surface of the sensor layer 400 includes a first surface SA1 and a second surface SA2. The first surface SA1 and the second surface SA2 form surfaces of the sensor layer 400 facing each other. Among the first surface SA1 and the second surface SA2, the surface that is closer to the first touch electrodes 410 and the second touch electrodes 420 among the first connection part 412, the first touch electrodes 410, and the second touch electrodes 420 is referred to as the first surface SA1, and the opposite surface of the first surface SA1 is referred as the second surface SA2. The positions of the first surface SA1 and the second surface SA2 may be changed. That is, the second surface SA2 may be located in a position closer to the display panel 300 than the first surface SA1.

As seen in FIG. 5, the optical film 550 may be positioned between the sensor layer 400 and the display panel 300. The adhesive layer 10 may be positioned between the sensor layer 400 and the optical film 550. The adhesive layer 10 may be in contact with a surface of the optical film 550, e.g., such as a surface of the optical film 550 that opposes the first surface SA1 of the sensor layer 400.

The adhesive layer 10 may include an organic polymer material, and may be a curable-type adhesive, such as a thermosetting-type or an ultraviolet (UV) light curable-type unlike a typical adhesive that does not change the material itself, but can be adhered to other materials by the viscosity of the adhesive itself. As such, the adhesive layer 10 includes a cured (or hardened) adhesive material.

The separation layer 120a may be positioned between the adhesive layer 10 and the sensor layer 400, or on the second surface SA2 of the sensor layer 400. FIG. 5 shows an example in which the separation layer 120a is positioned between the sensor layer 400 and the adhesive layer 10. In this case, the adhesive layer 10 may be directly adjacent to and in contact with the separation layer 120a. The adhesive layer 10 may be positioned between the separation layer 120a and the optical film 550, thereby adhering the separation layer 120a and the optical film 550 to each other.

The separation layer 120a may include the organic polymer material. For example, the separation layer 120a may include at least one of polyimide, polyvinyl alcohol, polyamic acid, polyamide, polyethylene, polystyrene, polynorbornene, a phenylmaleimide copolymer, polyazobenzene, polyphenylenephthalamide, polyester, polymethyl methacrylate, polyarylate, a cinnamate-based polymer, a coumarin-based polymer, a phthalimidine-based polymer, a chalcone-based polymer, and an aromatic acetylene-based polymer. The separation layer 120a may further include an inorganic material besides the organic polymer material.

The separation layer 120a may have a larger adhesion force with respect to the first touch electrodes 410 and the second touch electrodes 420 than with respect to glass. The thickness of the separation layer 120a in the third direction Dr3 may be about 1 micrometer to about 100 micrometers, but exemplary embodiments are not limited thereto or thereby.

Unlike as seen in FIG. 5, the optical film 550 may be positioned on the second surface SA2 of the sensor layer 400. In this manner, the adhesive layer 10 may be positioned between the second surface SA2 and the optical film 550.

In some exemplary embodiments, the optical film 550 may include at least one is among a transparent film and a polarization film. The transparent film may be an isotropic film. The polarization film (e.g., a film for improvement of optical characteristics) may include at least one polarization layer and at least one phase retardation layer. The polarization layer may include a polyvinyl alcohol (PVA) and may further include at least one supporting member. The polarization film may be a circular polarization film, and, in this case, the polarization film may include a linear polarization layer and a quarter wavelength phase retardation layer. In a case that the optical film 550 is a polarization film, the phase retardation layer in the polarization film may be between the polarization layer and the display panel 300. That is, the polarization layer may be positioned between the phase retardation layer and the sensor layer 400.

The optical film 550 may function to prevent (or reduce) external light from being reflected from the display panel 300, an electrode (e.g., the first touch electrodes 410, the second touch electrodes 420, etc.), and/or wiring included in, for instance, the sensor layer 400 from being recognized. In other words, light that is incident inside the display device 1 passes through the optical film 550, is reflected by an underlying electrode or wiring, and is again incident to the optical film 550 and causes destructive interference with ambient light incident to the optical film 550 such that the light may not be recognized outside of the display device 1.

In a manufacturing process of the optical touch film 600, according to some exemplary embodiments, the sensor layer 400 is formed on the separation layer 120a after forming the separation layer 120a on a separate carrier substrate (not shown). The sensor layer 400 is separated from the carrier substrate along with the separation layer 120a, and the separated sensor layer 400 and the separation layer 120a are attached to a surface of the optical film 550 using the adhesive layer 10. In this manner, the optical film 550 is not damaged by the process for forming the sensor layer 400. It is also noted that the optical film 550 and the sensor layer 400 may have a relatively high adherence and fixing force. Accordingly, when the display device 1 is flexible, a potential for separation between the optical film 550 and the sensor layer 400 is reduced or eliminated such that a defect is not generated.

Conventionally, films functioning as a sensing layer and an optical film are respectively formed and attached to a display panel; however, according to some exemplary embodiments, since the sensor layer 400 is attached on the optical film 550 through the adhesive layer 10, one optical touch film 600 having a sensing function that also improves the optical characteristics of the display device 1 may replace two or more conventional films. Accordingly, the entire thickness of the display device 1 may be reduced. In the case of a flexible display device, the reduced thickness also reduces stress when the display device 1 is deformed. Further, the optical touch film 600 having the plurality of functions, such as the sensing function and the optical characteristic improvement function, only includes one film such that a film cost may be reduced and manufacturing cost of the display device 1 may be reduced. Moreover, a number of films positioned on the display panel 300 may be minimized (or reduced) such that transmittance of an image displayed via the display panel 300 may be increased and a color change (or shift) may be minimized (or reduced).

Adverting back to FIG. 1, the controller 700 may control an operation of the display panel 300 and the optical touch film 600. For instance, the controller 700 may receive an input image signal from a source (e.g., an outside source) and may apply the signal to the display panel 300 based on the input image signal. The controller 700 may be connected to the sensor of the optical touch film 600, thereby controlling the operation of the sensor. That is, the controller 700 may transmit the sensing input signal to the sensor or may receive the sensing output signal to be processed, thereby generating contact information, such as contact existence information and contact position information.

In some exemplary embodiments, the controller 700 may be directly mounted on the display panel 300 or the optical touch film 600 in at least one integrated circuit (IC) chip form, mounted on a flexible printed circuit film (not illustrated) to be attached to the display panel 300 or the optical touch film 600 in a tape carrier package (TCP) form, or mounted on a separate printed circuit board (not illustrated).

Next, a manufacturing method of the display device 1 according to some exemplary embodiments will be described with reference to FIGS. 6 and 7 along with continued reference to FIGS. 1 to 5.

Figure 6:
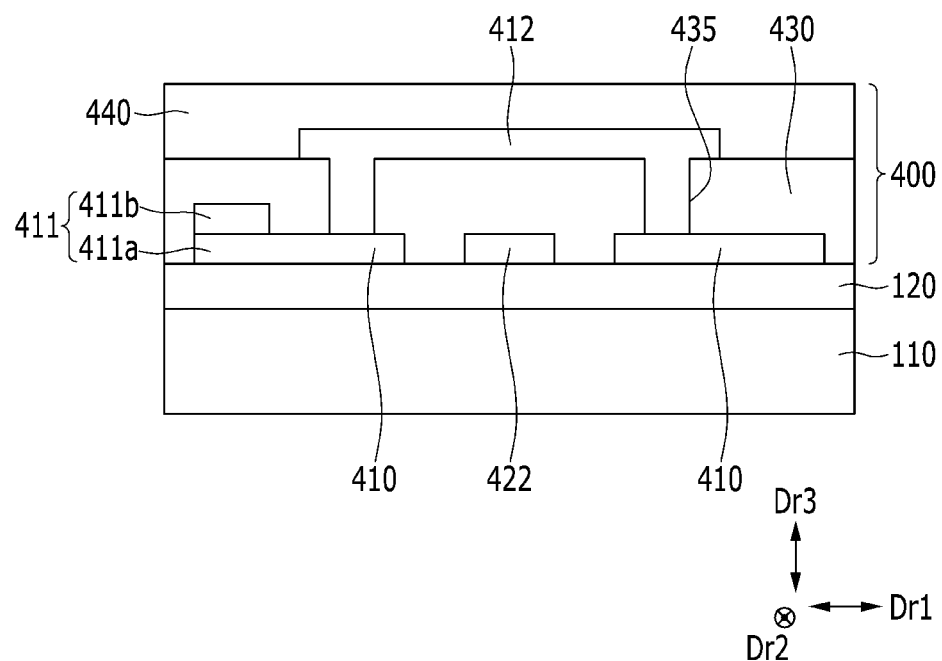
FIGS. 6 and 7 are cross-sectional views of an intermediate product at an intermediate step of a process of manufacturing an optical touch film according to some exemplary embodiments.
Figure 7:
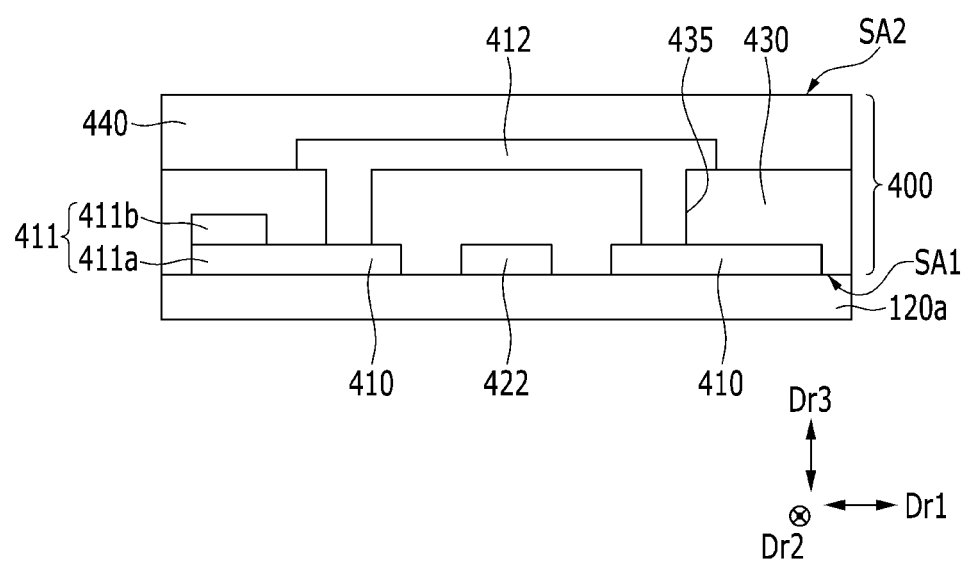

FIGS. 6 and 7 are cross-sectional views of an intermediate product at an intermediate step of a process of manufacturing an optical touch film according to some exemplary embodiments.

Referring to FIG. 6, a polymer organic material is coated on a carrier substrate 110 to form a separation layer 120. The carrier substrate 110 may include glass; however, any suitable material may be utilized in association with exemplary embodiments.

The first touch electrodes 410, the second touch electrodes 420, the first touch wires 411, the second touch wires 421, the first connection parts 412, and the second connecting parts 422 are formed on the separation layer 120. For instance, a first conductive layer (not shown) including a transparent conductive material, such as ITO and/or IZO, and a second conductive layer (not shown) including a low resistance material, such as a metal, are sequentially deposited on the separation layer 120 and patterned. Part of the second conductive layer except for portions corresponding to the first touch wires 411 and the second touch wires 421 is removed to form the first touch wires 411 and the second touch wires 421 including a first conductive layer 411a and a second conductive layer 411b. Patterning of the second conductive layer and the first conductive layer is performed to form a plurality of first touch electrodes 410, a plurality of second touch electrodes 420, and a plurality of second connection parts 422. An insulating material is deposited on the first touch electrodes 410, the second touch electrodes 420, the second connection parts 422, the first touch wires 411, and the second touch wires 421 and is patterned to form a first insulating layer 430 having contact holes 435. A conductive material is then deposited on the first insulating layer 430 and patterned to form first connection parts 412. An insulating material is deposited on the first connection parts 412 and the first insulating layer 430 to form a second insulating layer 440.

Differently from as described in association with FIG. 6, vertical deposition positions of the first touch electrodes 410 and the second touch electrodes 420 and the first connection parts 412 may be changed.

Referring to FIG. 7, after forming the sensor layer 400, the separation layer 120 is peeled and separated from the carrier substrate 110 along with the sensor layer 400. A roll-to-roll peeling method may be used as a peeling method; however, any other suitable method may be utilized in association with exemplary embodiments. In this manner, the separation layer 120a may be positioned under the first surface SA1 of the separated sensor layer 400. The separation layer 120a may substantially include most of the separation layer 120 that exists before the separation process is performed. Accordingly, the thickness of the separation layer 120a in the third direction Dr3 may be substantially equal to or slightly smaller than the thickness of the separation layer 120 in the third direction Dr3 before the separation process.

Referring to FIG. 5, an adhesive material is coated on the lower surface of the separation layer 120a positioned under the separated sensor layer 400 and/or the upper surface of the sensor layer 400 to form an adhesive layer 10. The optical film 550 and the sensor layer 400 are attached via the adhesive layer 10, and the adhesive layer 10 is cured (or hardened) through thermal curing (or hardening) or ultraviolet (UV) curing (or hardening), thereby integrating the sensor layer 400 and the optical film 550. Accordingly, the optical touch film 600 according to some exemplary embodiments may be formed.

According to the manufacturing method of the display device 1 according to some exemplary embodiments, the sensor layer 400 is separately formed on the carrier substrate 110 and is separated and then attached to the optical film 550 such that the optical film 550 may not be damaged by the heating in the manufacturing process of the sensor layer 400. Further, this process also enables the optical film 550 and the sensor layer 400 to have relatively high (or good) adherence. Also, the optical touch film 600 having the plurality of functions, such as the sensing function and the optical characteristic improvement function, only includes one film such that the film cost may be reduced, thereby reducing the manufacturing cost of the display device 1 and the thickness of the display device 1.

Various modifications to the optical touch film 600 included in the display device 1 according to some exemplary embodiments will be described with reference to FIGS. 8 to 31 along with FIGS. 1 to 5. To avoid obscuring exemplary embodiments, primarily differences will be discussed below.

FIGS. 8 through 31 are cross-sectional views of optical touch films included in display devices according to various exemplary embodiments.

Figure 8:
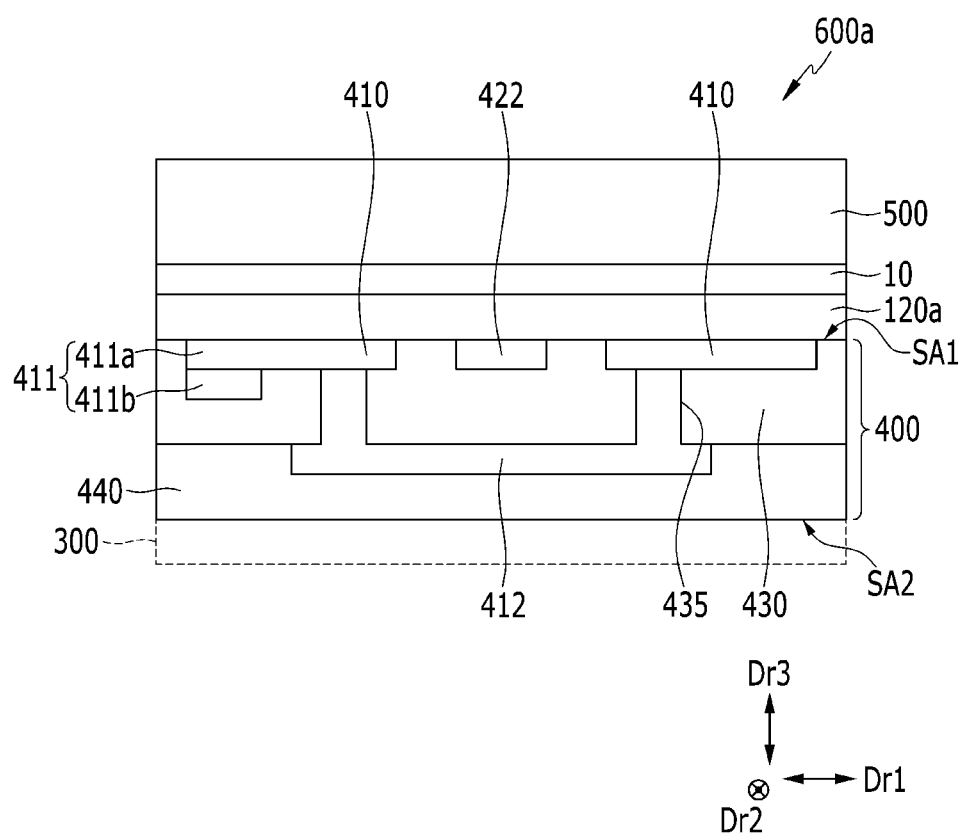
FIGS. 8 through 31 are cross-sectional views of optical touch films included in display devices according to various exemplary embodiments.

Referring to FIG. 8, the optical touch film 600a, which may be included in the display device 1, is similar to the optical touch film 600; however, the sensor layer 400 may be positioned between an optical film 500 and the display panel 300. The optical film 500 is substantially the same as the optical film 550 described above. In the case that the optical film 500 is a polarization film, the phase retardation layer included in the polarization film may be positioned between the polarization layer and the sensor layer 400. The optical film 500 may be positioned on the first surface SA1 of the sensor layer 400. The adhesive layer 10 and the separation layer 120a may be positioned between the first surface SA1 and the optical film 500.

According to some exemplary embodiments, since the optical film 500 is positioned further away from the display panel 300 than the sensor layer 400, external light reflected by an electrode or wiring included in the sensor layer 400 may be more effectively prevented (or reduced) from being recognized.

Figure 9:
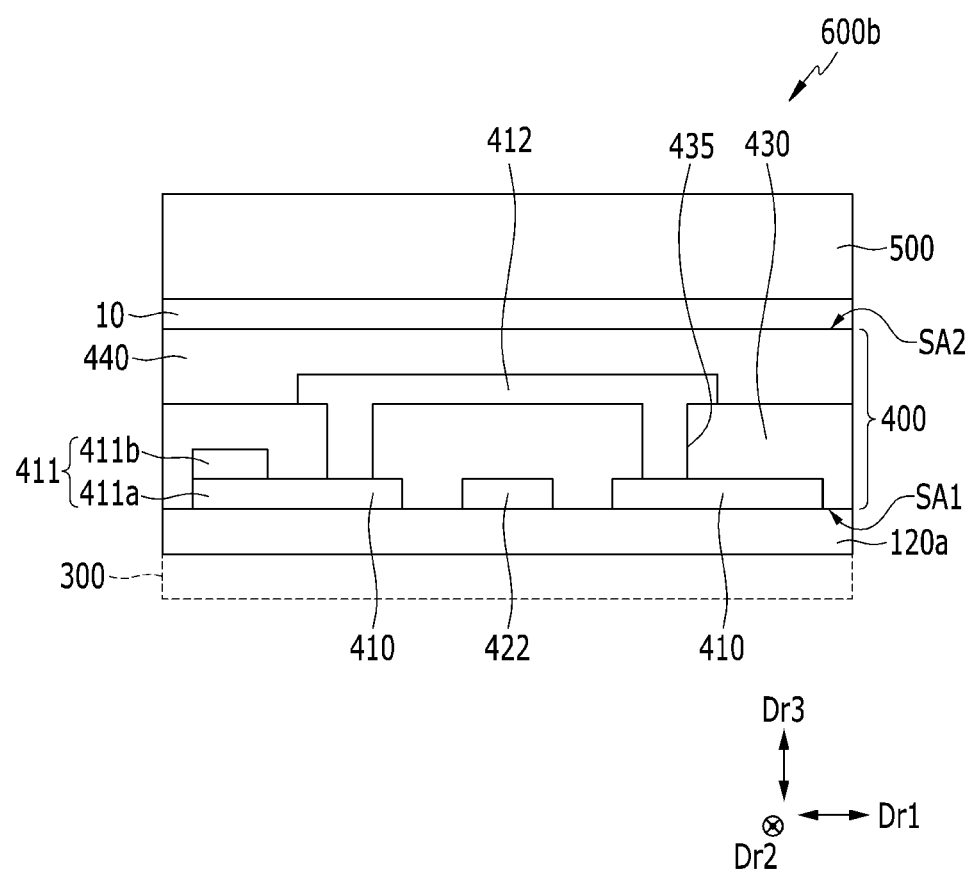

Referring to FIG. 9, the optical touch film 600b, which may be included in the display device 1, is similar to the optical touch film 600a; however, the vertical direction (or orientation) of the sensor layer 400 may be different. That is, the display panel 300 may be positioned under the first surface SA1 of the sensor layer 400, and the optical film 500 may be positioned on the second surface SA2 of the sensor layer 400. Also, the separation layer 120a is not in contact with the adhesive layer 10, but may be positioned between the display panel 300 and the sensor layer 400.

Figure 10:
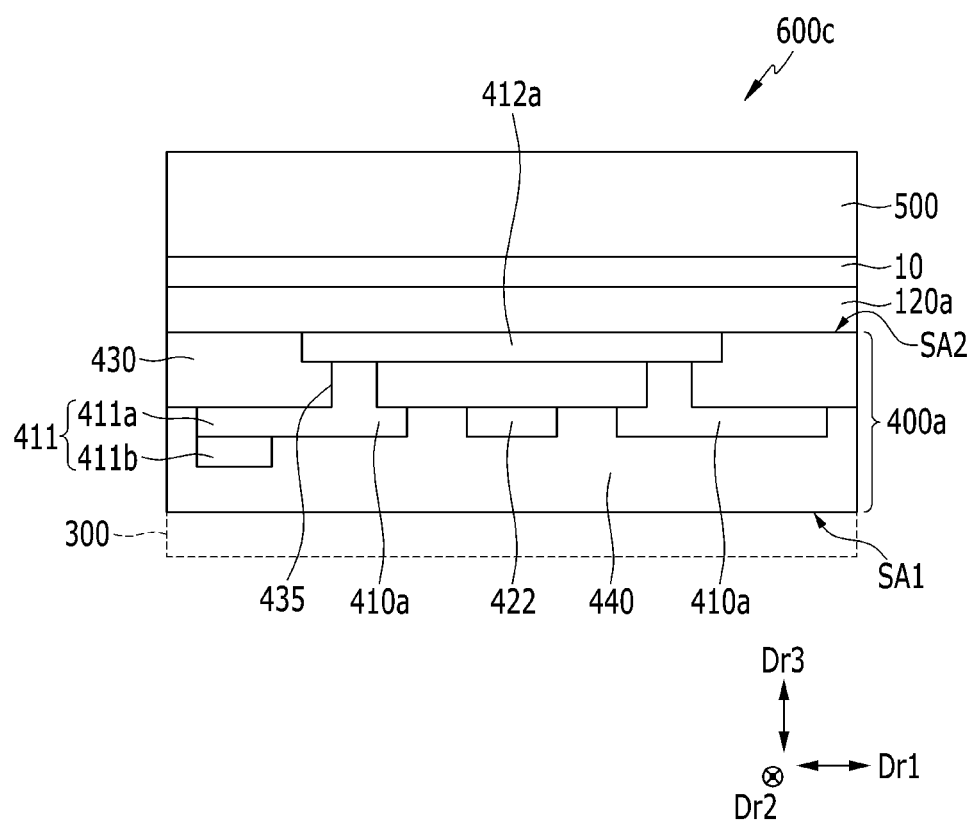

Referring to FIG. 10, the optical touch film 600c, which may be included in the display device 1, is similar to the optical touch film 600a except for the structure of the sensor layer 400a. For instance, the first connection part 412a may be positioned under the separation layer 120a, the first insulating layer 430 having the contact holes 435 may be positioned under the first connection part 412a, the first touch electrodes 410a, the second touch electrodes 420, the first touch wires 411, and the second touch wires 421 may be positioned under the first insulating layer 430, and the second insulating layer 440 may be positioned thereunder. In this case, the main surface of the sensor layer 400a that is closer to the first touch electrodes 410*a* and the second touch electrodes 420 than the first connection part 412*a* is referred to as the first surface SA1. The surface of the opposite side of the sensor layer 400*a* is referred to as the second surface SA2.

Referring to FIGS. 11 through 31, the optical touch films are similar to the optical touch films 600, 600*a*, 600*b*, and 600*c* except for at least one high refractive insulating layer included in the sensor layer 400 or positioned around the sensor layer 400. For instance, the at least one high refractive insulating layer may be disposed at a layer that is adjacent to and contacts the first touch electrodes 410 and the second touch electrodes 420 forming a sensor.

Figure 11:
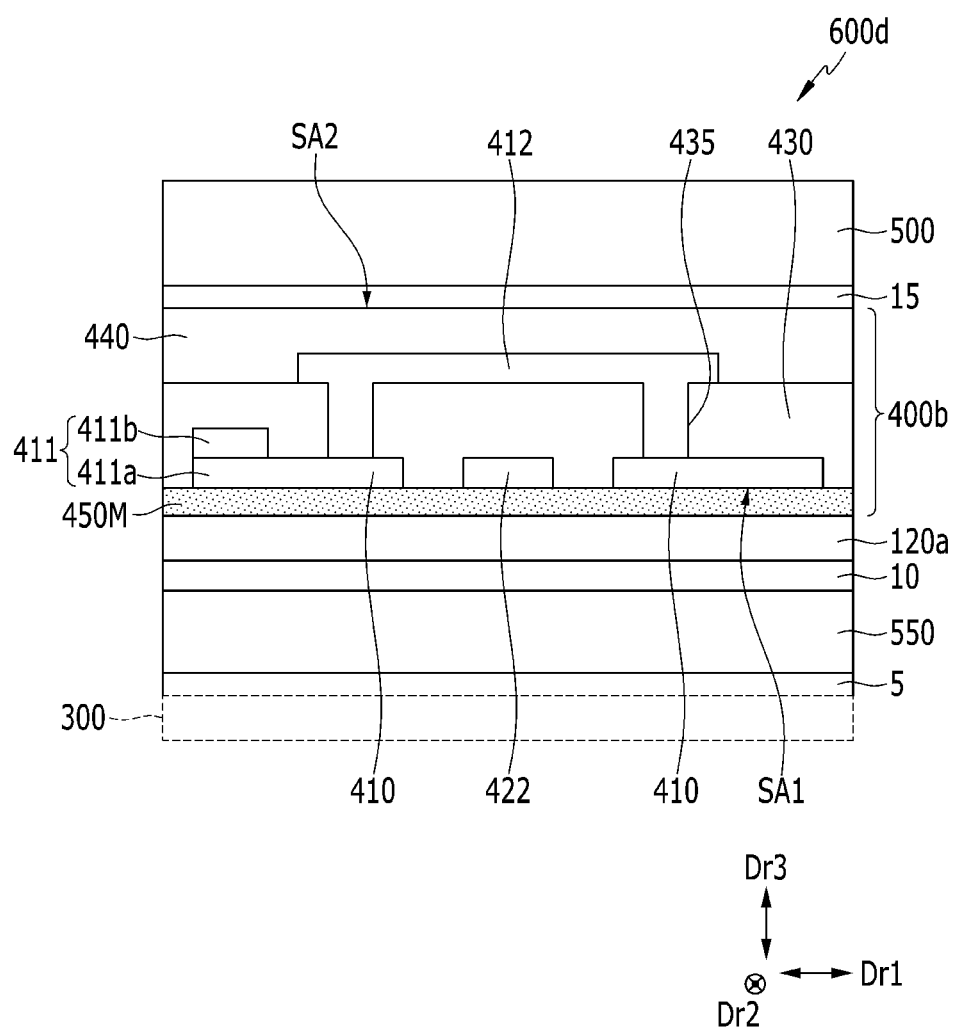

FIG. 11 shows an example in which a high refractive insulating layer 450M is positioned at a layer between the separation layer 120*a* and the first touch electrodes 410 and the second touch electrodes 420. The high refractive insulating layer 450M may be a refractive index matching layer to reduce total reflection, to smooth a pattern reflection of the sensor layer 400*b*, and to decrease transmittance by smoothing the refraction of the light from the surface of the first touch electrodes 410 and second touch electrodes 420. In this manner, the refractive index of the high refractive insulating layer 450M may have a high refractive index close to the refractive index of the first touch electrodes 410 and the second touch electrodes 420.

In some exemplary embodiments, the refractive index of the high refractive insulating layer 450M may be greater than about 1.5. For instance, the refractive index of the high refractive insulating layer 450M may be in a range from about 1.6 to about 2.0. In some exemplary embodiments, the refractive index of the high refractive insulating layer 450M may be greater than the refractive index of any insulating layer (e.g., the separation layer 120*a* and the second insulating layer 440) except for a conductive layer (e.g., the first touch electrodes 410, the second touch electrodes 420, the first connection parts 412, and the second connection parts 422) among layers constituting the optical touch film 600*d*. That is, the refractive index of the high refractive insulating layer 450M may be the closest to the refractive index of the first touch electrodes 410 and the second touch electrodes 420 among insulating layers (e.g., the separation layer 120*a* and the second insulating layer 440) of the optical touch film 600*d*.

In a case that the first touch electrodes 410 and the second touch electrodes 420 include indium tin oxide (ITO), then when the high refractive insulating layer 450M having a similar refractive index to the refractive index of the first touch electrodes 410 and the second touch electrodes 420 is disposed to contact the first touch electrodes 410 and the second touch electrodes 420, total reflection may be reduced, and pattern reflection of the sensor layer 400*b* and a decrease in transmittance may be prevented or reduced given that the refractive index of ITO is approximately in a range from about 1.7 to about 1.9. The refractive index of the separation layer 120*a* may be smaller than the refractive index of the high refractive insulating layer 450M. For example, the refractive index of the separation layer 120*a* may be greater than 0 and less than or equal to about 1.5. The refractive index of the second insulating layer 440 may be smaller than the refractive index of the high refractive insulating layer 450M. For example, the refractive index of the second insulating layer 440 may be greater than 0 and less than or equal to about 1.5.

In addition, the high refractive insulating layer 450M positioned in contact with the first touch electrodes 410 and the second touch electrodes 420 enhances the film quality of the first touch electrodes 410 and the second touch electrodes 420 such that it is possible to prevent (or reduce) defects, such as cracks, etc., from occurring in the first touch electrodes 410 and the second touch electrodes 420. For instance, when the optical touch film 600*d* is attached to a flexible display device and is deformed (e.g., bended, curved, etc.), the first touch electrodes 410 and the second touch electrodes 420 formed of ITO or the like are likely to crack. Even in this case, since the high refractive insulating layer 450M is disposed to contact the first touch electrodes 410 and the second touch electrodes 420, occurrence of defects, such as cracks, etc., can be prevented (or reduced).

The high refractive insulating layer 450M may be a coating-type of insulating layer formed by a coating method. The high refractive insulating layer 450M may include an organic material (e.g., a organic polymer material), and may further include nanoparticles. The nanoparticles may include a material, such as zirconium dioxide ($ZrO_2$), silicon dioxide ($SiO_2$), and the like. According to some exemplary embodiments, the high refractive insulating layer 450M may include various high refractive index polymers (HIRP) or an inorganic thin film. The high refractive insulating layer 450M may be formed through the coating method in the formation process of the sensor layer 400*b*.

The thickness in the third direction Dr3 of the high refractive insulating layer 450M may be in a range from about several nanometers to about several micrometers; for example, may be in a range from about 1 nanometer to about 10 micrometers. However, the thickness of the high refractive insulating layer 450M may be changed according to the thickness and/or characteristics of the layers included in the first touch electrodes 410 and the second touch electrodes 420.

In some exemplary embodiments, the separation layer 120*a*, the optical film 550, and the display panel 300 may be sequentially disposed on the first surface SA1 side of the sensor layer 400*b*. The optical film 550 may be an isotropic film. An adhesive layer 5 may be positioned between the display panel 300 and the optical film 550. The adhesive layer 5 may comprise, for example, a pressure sensitive adhesive (PSA) material, and may be able to be separated after having been bonded according to environmental conditions. An optical film 500 may be adhered on the sensor layer 400*b* through the adhesive layer 15. The adhesive layer 15 may have the same properties as the adhesive layer 5. The optical film 500 may be a polarization film. Also, the adhesive layer 10 may be in contact with the separation layer 120*a*. the high refractive insulating layer 450M may be in contact with the separation layer 120*a*.

Figure 12:
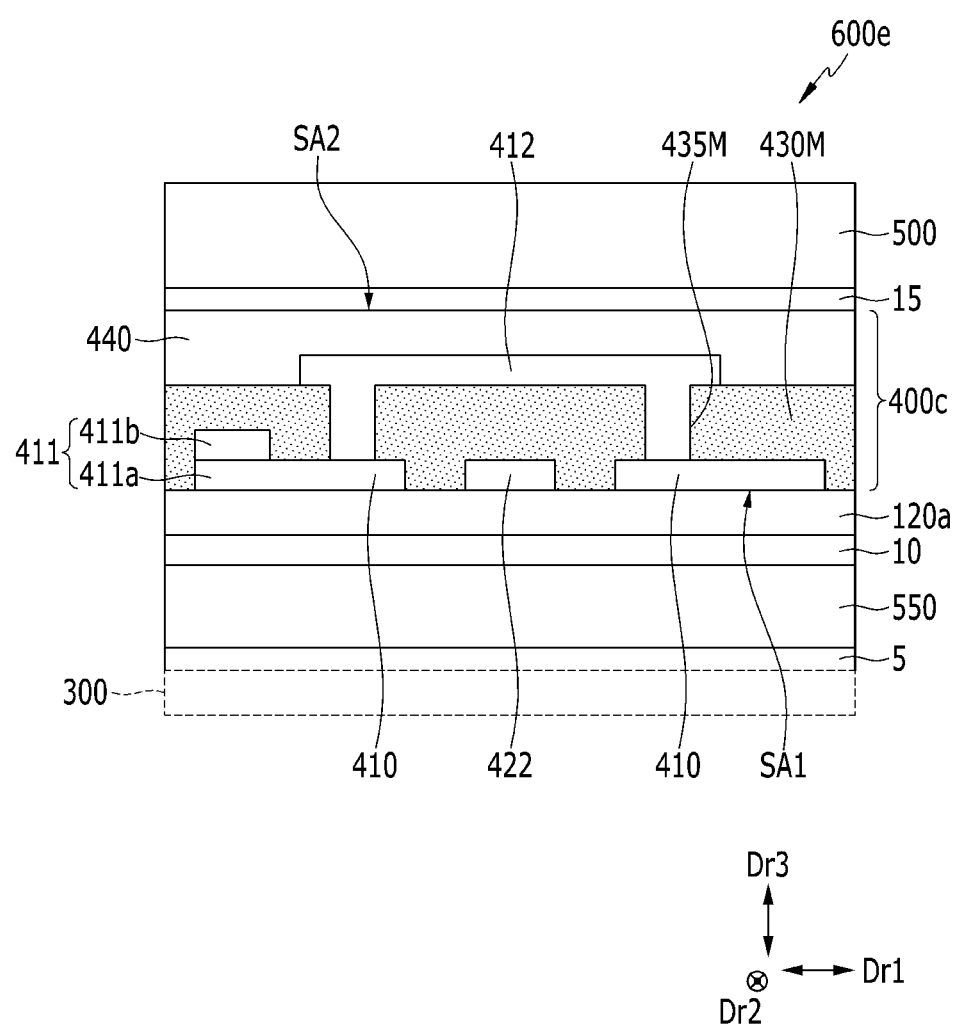

Referring to FIG. 12, an optical touch film 600*e* is similar to the optical touch film 600*d*; however, instead of including the high refractive insulating layer 450M, the sensor layer 400*c* may include a high refractive insulating layer 430M disposed between the first touch electrodes 410 and the second touch electrodes 420 and the first connection parts 412. In this case, a part or the entirety of the first insulating layer 430 may be omitted, and the high refractive insulating layer 430M may be disposed in the place where the first insulating layer 430 is omitted. To this end, the high refractive insulating layer 430M may include contact holes 435M in place of the contact holes 435. The characteristics of the high refractive insulating layer 430M and the effects thereof may be the same as those of the high refractive insulating layer 450M.

Figure 13:
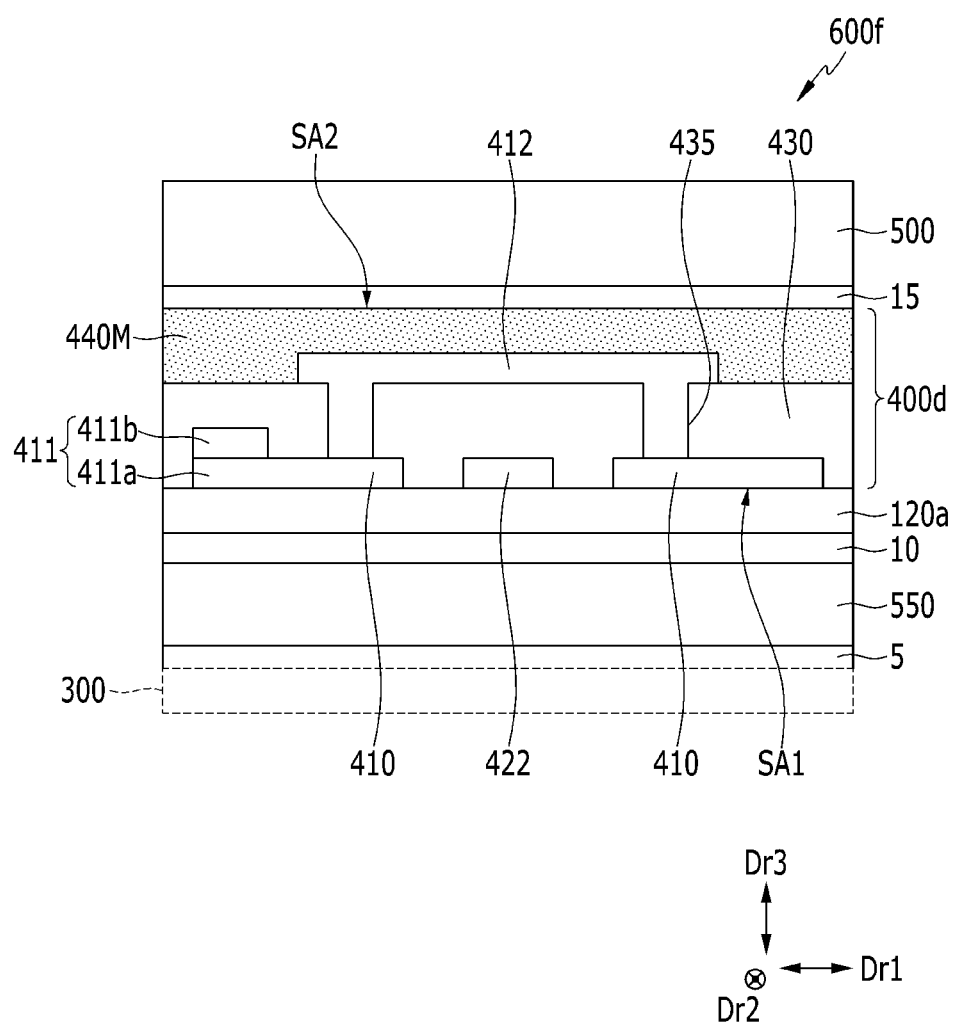

Referring to FIG. 13, an optical touch film 600*f* is similar to the optical touch film 600*d*; however, instead of the high refractive insulating layer 450M, the sensor layer 400*d* may include a high refractive insulating layer 440M disposed in a layer on the first connection part 412. In this case, a part or the entirety of the second insulating layer 440 may be omitted, and the high refractive insulating layer 440M may be disposed in the place where the second insulating layer 440 is omitted. The characteristics of the high refractive insulating layer 440M and the effects thereof may be the same as those of the high refractive insulating layer 450M.

Figure 14:
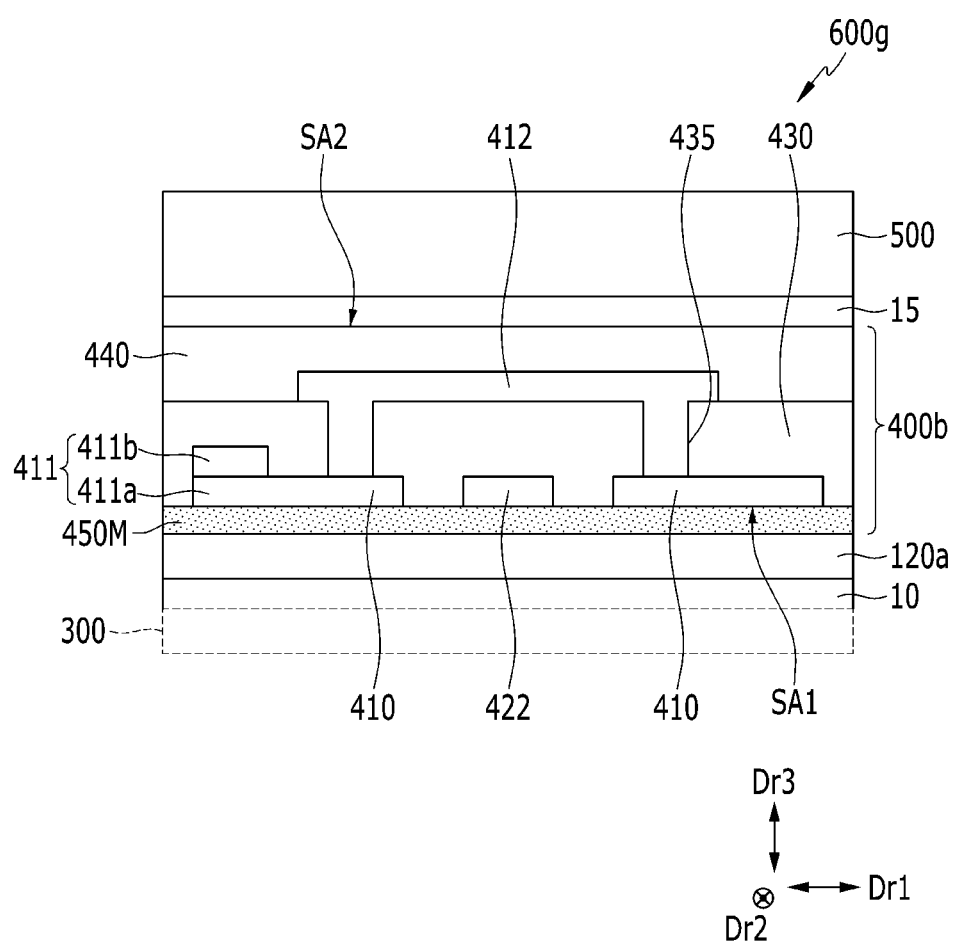

Referring to FIG. 14, an optical touch film 600g is substantially the same as the optical touch film 600d; however, the optical film 550 and the adhesive layer 5 between the display panel 300 and the sensor layer 400b are omitted.

Figure 15:
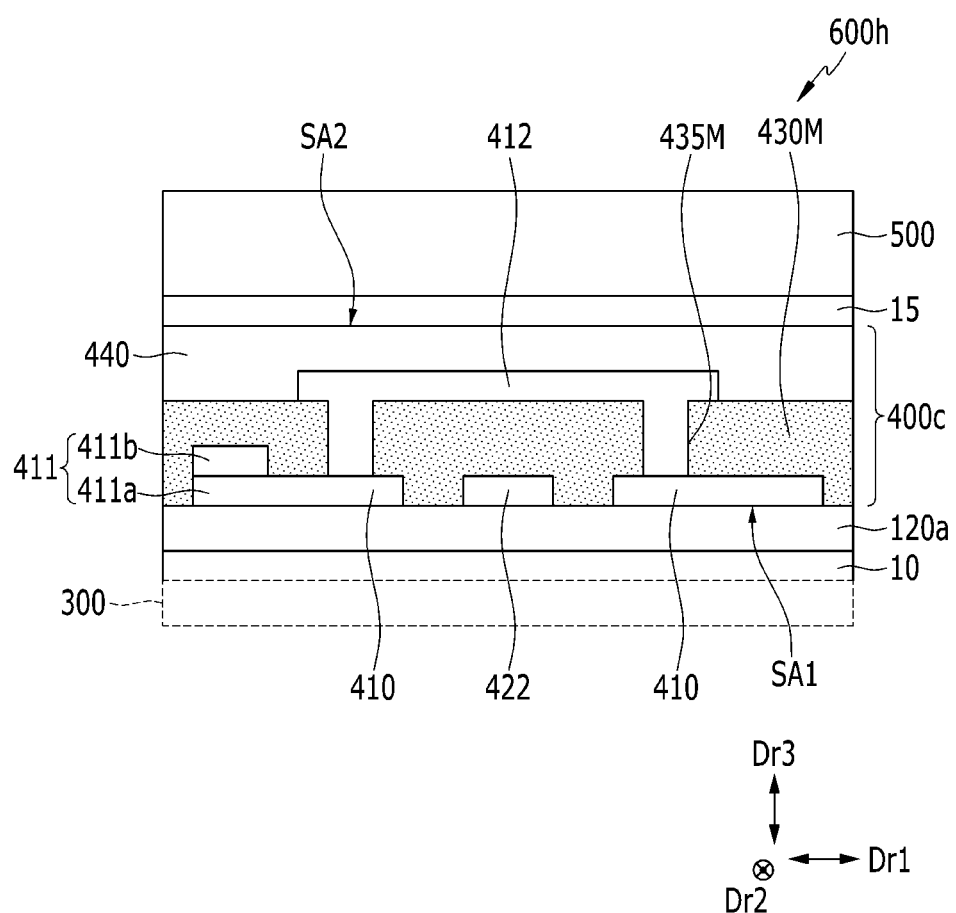

Referring to FIG. 15, an optical touch film 600h is substantially the same as the optical touch film 600e; however, the optical film 550 and the adhesive layer 5 between the display panel 300 and the sensor layer 400c are omitted.

Figure 16:
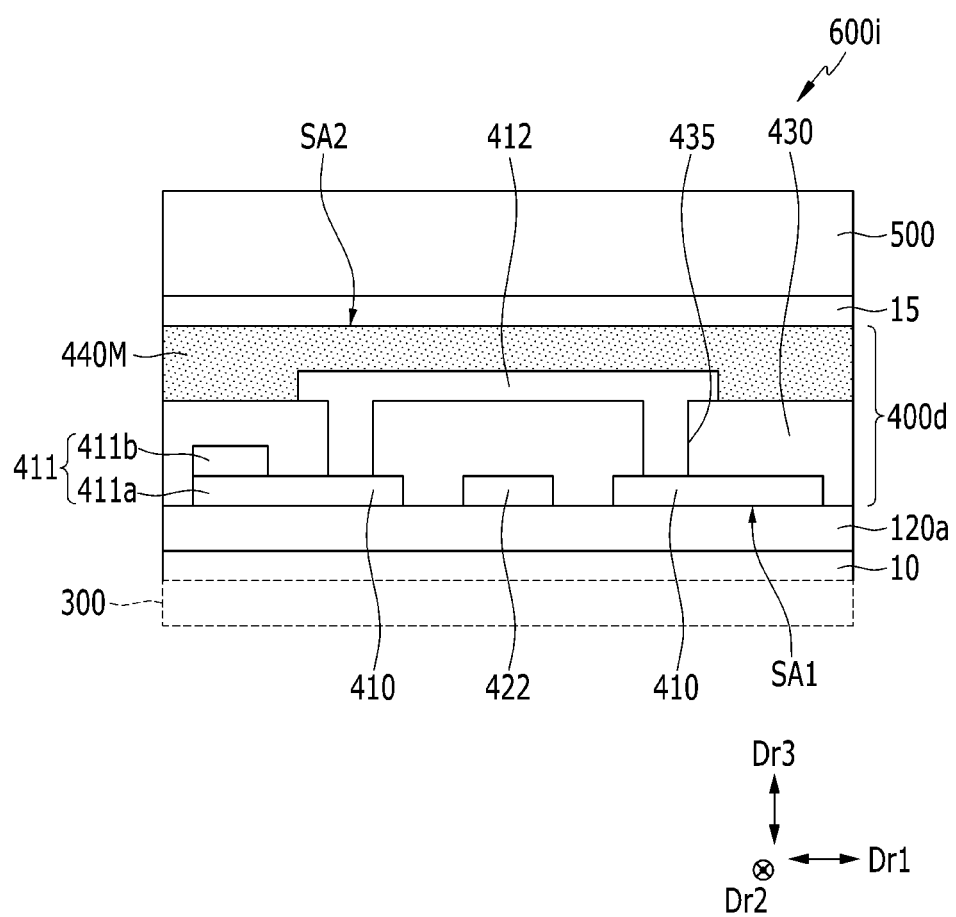

Referring to FIG. 16, an optical touch film 600i is substantially the same as the optical touch film 600f; however, the optical film 550 and the adhesive layer 5 between the display panel 300 and the sensor layer 400d are omitted.

Figure 17:
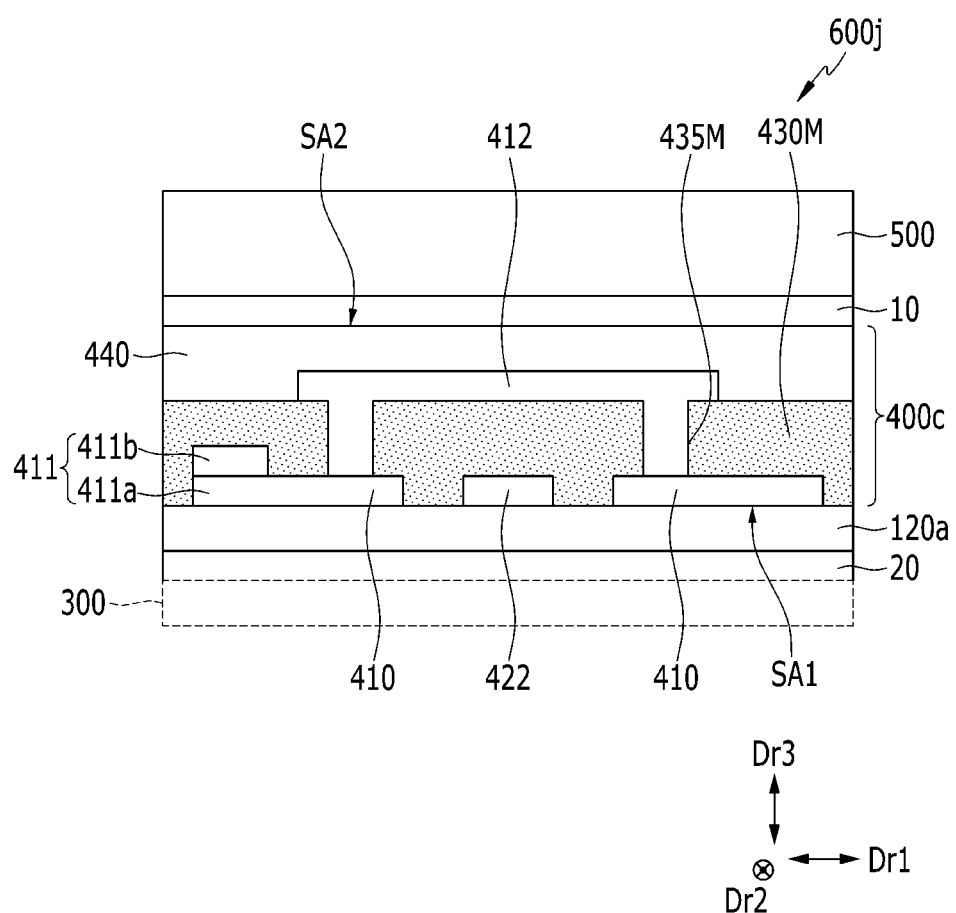

Referring to FIG. 17, an optical touch film 600j is substantially the same as the optical touch film 600h; however, a curing-type adhesive layer 10 including an organic polymer material may be disposed between the sensor layer 400c and the optical film 500, and an adhesive layer 20 may be disposed between the separation layer 120a and the display panel 300. The adhesive layer 20 may have the same properties as the adhesive layer 5.

Figure 18:
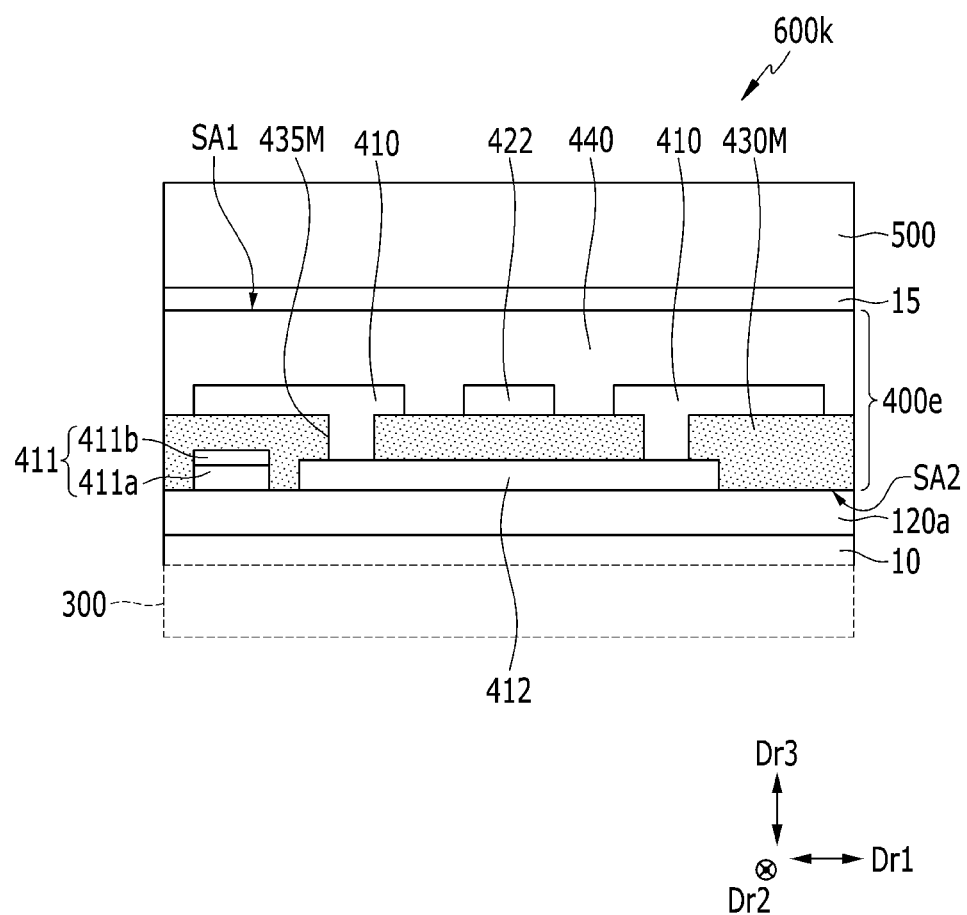

Referring to FIG. 18, an optical touch film 600k is similar to the optical touch film 600e; however, the sensor layer 400e may have a similar structure to the sensor layer 400a. That is, the top and bottom positions of the first surface SA1 and the second surface SA2 may be changed. For instance, the first connection part 412, the first touch wires 411, and the second touch wires 421 may be disposed on the separation layer 120a; the first touch electrodes 410, the second touch electrodes 420, and the second connection part 422 may be disposed on the first connection part 412, the first touch wires 411, and the second touch wires 421; and the second insulating layer 440 may be disposed on the first touch electrodes 410, the second touch electrodes 420, the second connection part 422, and exposed portions of the high refractive insulating layer 430M. The first touch wires 411 and the second touch wires 421 may include a first conductive layer 411a and a second conductive layer 411b. The first conductive layer 411a may be disposed in a same layer as the first connection part 412, and may include a same material as the first connection part 412. The second conductive layer 411b may be disposed on the first conductive layer 411a, and may include a low resistance material, such as a metal.

As seen in FIG. 18, the high refractive insulating layer 430M is disposed between the first connection part 412 and the second connection part 422 as an example including the at least one high refractive insulating layer. The high refractive insulating layer 430M may be disposed in a layer in contact with the first touch electrodes 410 and the second touch electrodes 420. The high refractive insulating layer 430M may have a contact hole 435M positioned to expose portions of the first connection part 412. In addition, the characteristics of the high refractive insulating layer 430M and the effects thereof are equivalent to those of the various high refractive insulating layers previously described.

Figure 19:
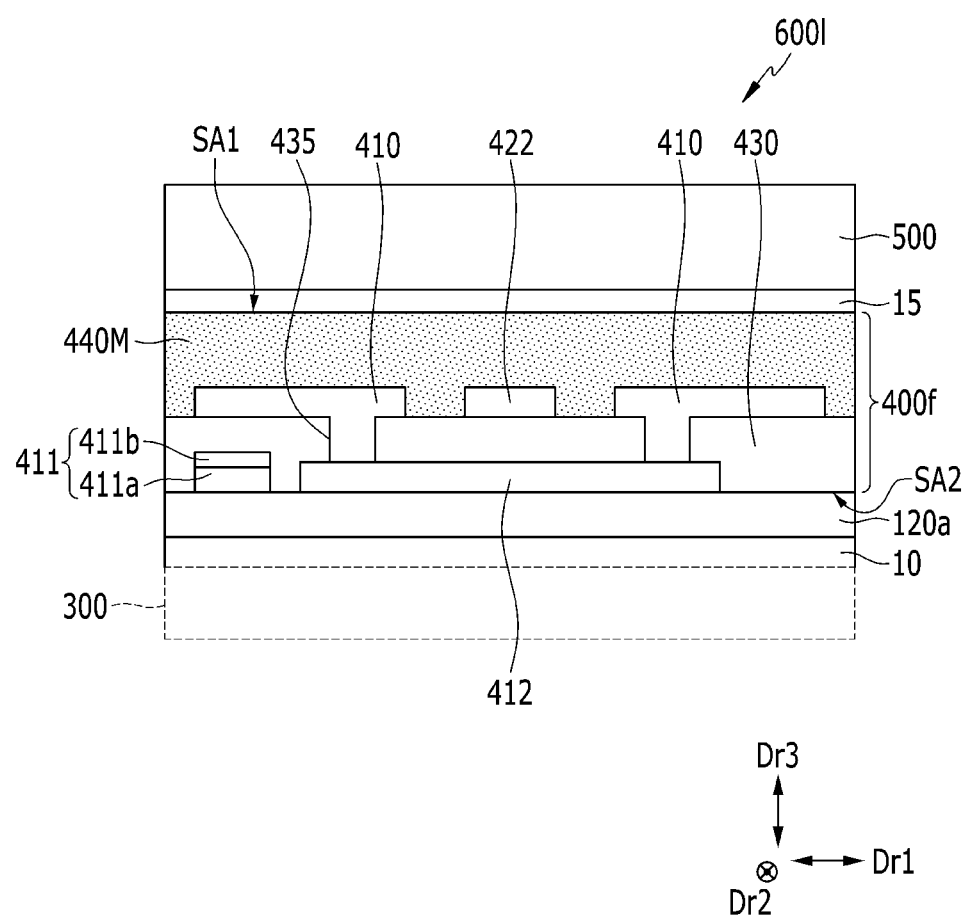

Referring to FIG. 19, an optical touch film 600l is substantially the same as the optical touch film 600k; however, instead of including the high refractive insulating layer 430M, a sensor layer 400f includes the high refractive insulating layer 440M disposed between the optical film 500 and the first touch electrodes 410 and the second touch electrodes 420. The high refractive insulating layer 440M may be disposed in a layer in contact with the first touch electrodes 410 and the second touch electrodes 420. In this case, a part or the entirety of the second insulating layer 440 may be omitted, and the high refractive insulating layer 440M may be disposed in the place where the second insulating layer 440 is omitted.

Figure 20:
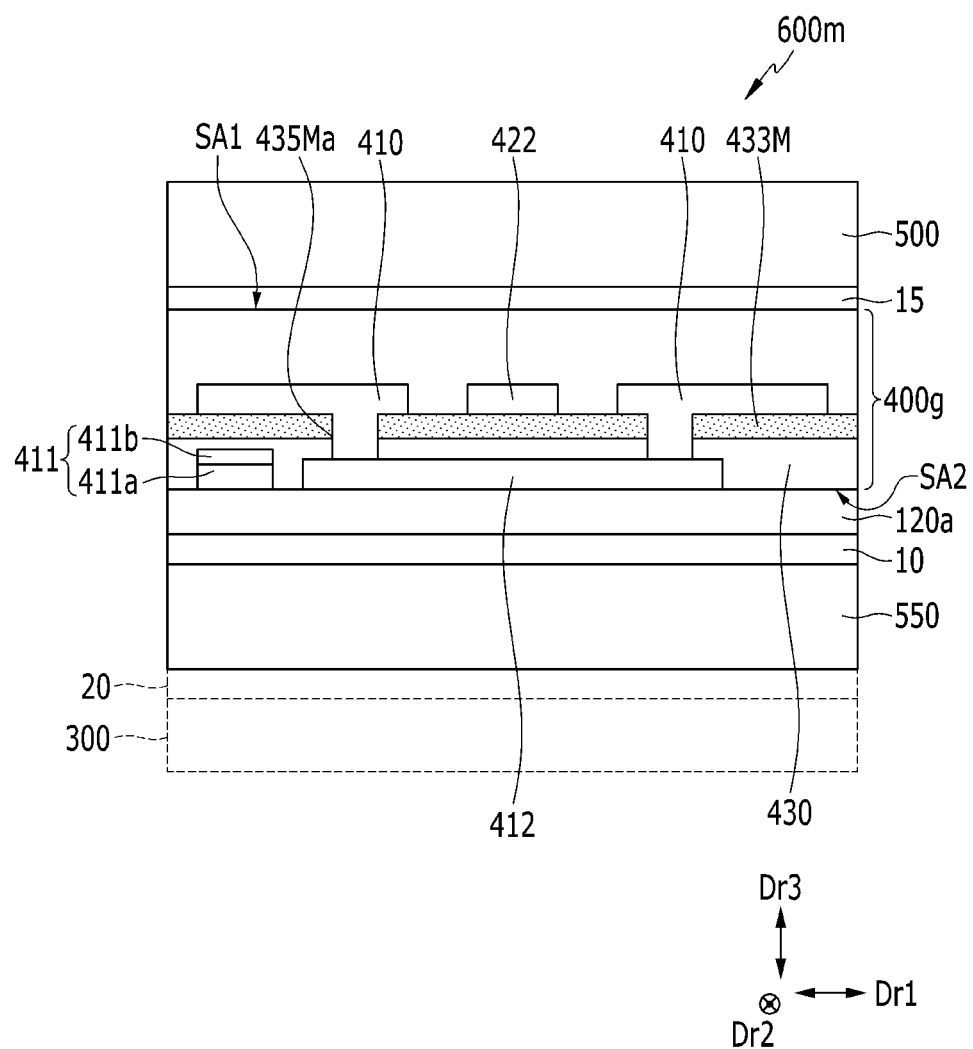

Referring to FIG. 20, an optical touch film 600m is substantially the same as the optical touch film 600l; however, the sensor layer 400g may include the first insulating layer 430 and the high refractive insulating layer 433M between the first connection part 412 and the second connection part 422. In this manner, contact holes 435Ma may be formed through the high refractive insulating layer 433M and the first insulating layer 430 to expose portions of the first connection part 412. The high refractive insulating layer 433M may be disposed in a layer in contact with the first touch electrodes 410 and the second touch electrodes 420. That is, the high refractive insulating layer 433M, the first insulating layer 430, and the first connection part 412 may be sequentially disposed below the first touch electrodes 410, the second touch electrodes 420, and the second connection part 422. In addition, the optical film 550 may be disposed between the separation layer 120a and the display panel 300. The adhesive layer 10 may be disposed between the optical film 550 and the separation layer 120a. The adhesive layer 20 may be disposed between the optical film 550 and the display panel 300. The optical film 550 may be an isotropic film. It is noted, however, that the optical film 550 and the adhesive layer 5 between the sensor layer 400g and the display panel 300 may be omitted.

Figure 21:
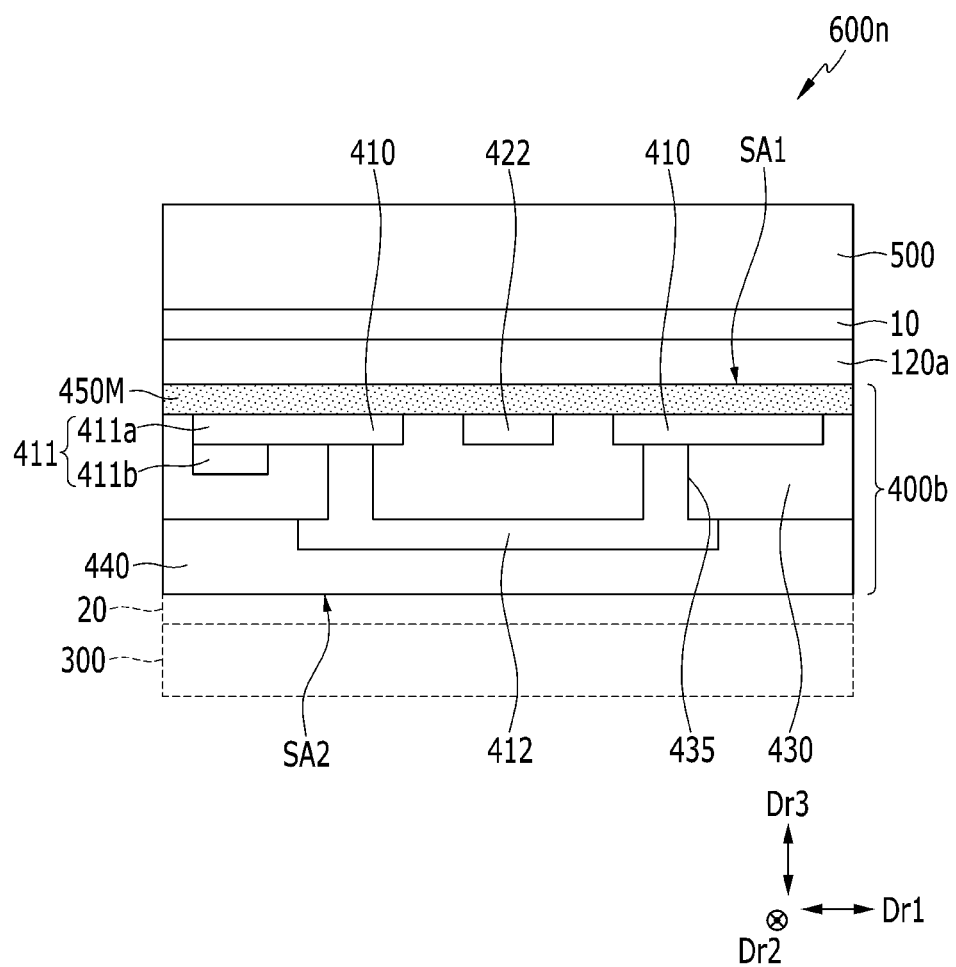

Referring to FIG. 21, an optical touch film 600n is similar to the previously described optical touch films; however, the optical touch film 600n may include the sensor layer 400b in a different orientation, e.g., the first surface SA1 may be disposed further from the display panel 300 than the second surface SA2. In addition, the optical touch film 600n may include the sensor layer 400b disposed on the display panel 300, the separation layer 120a disposed on the sensor layer 400, and the optical film 500 disposed the separation layer 120a. To this end, the optical film 500 may be a polarization film, and the adhesive layer 10 may be disposed between the optical film 500 and the separation layer 120a. The adhesive layer 20 may be disposed between the sensor layer 400b and the display panel 300. In addition, the high refractive insulating layer 450M may be disposed between the adhesive layer 10 and the first touch electrodes 410 and the second touch electrodes 420.

Figure 22:
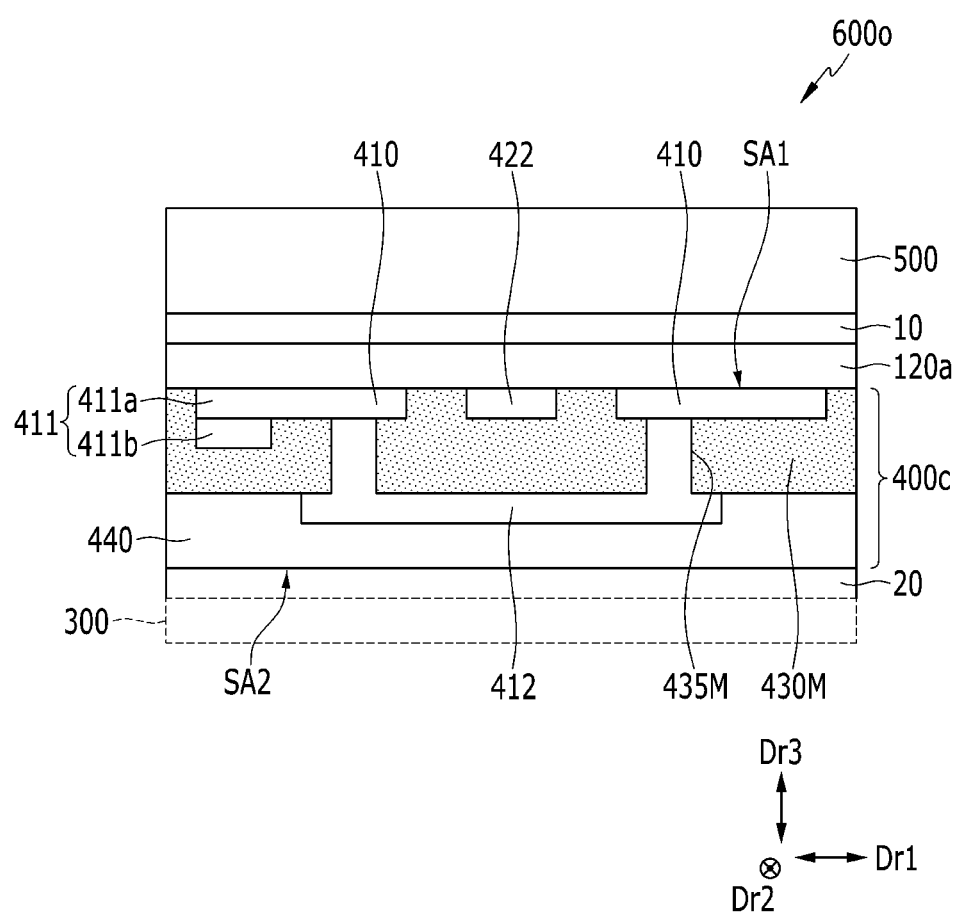

Referring to FIG. 22, an optical touch film 600o is substantially the same as the optical touch film 600n and may include the sensor layer 400c in a different orientation (e.g., the first surface SA1 may be disposed further from the display panel 300 than the second surface SA2). In this manner, instead of the sensor layer 400c including the high refractive insulating layer 450M, the sensor layer 400c may include the high refractive insulating layer 430M disposed between the first connection part 412 and the first touch electrodes 410 and the second touch electrodes 420. In this case, a part or the entirety of the first insulating layer 430 may be omitted. The high refractive insulating layer 430M may be disposed in the place where the first insulating layer 430 is omitted.

Figure 23:
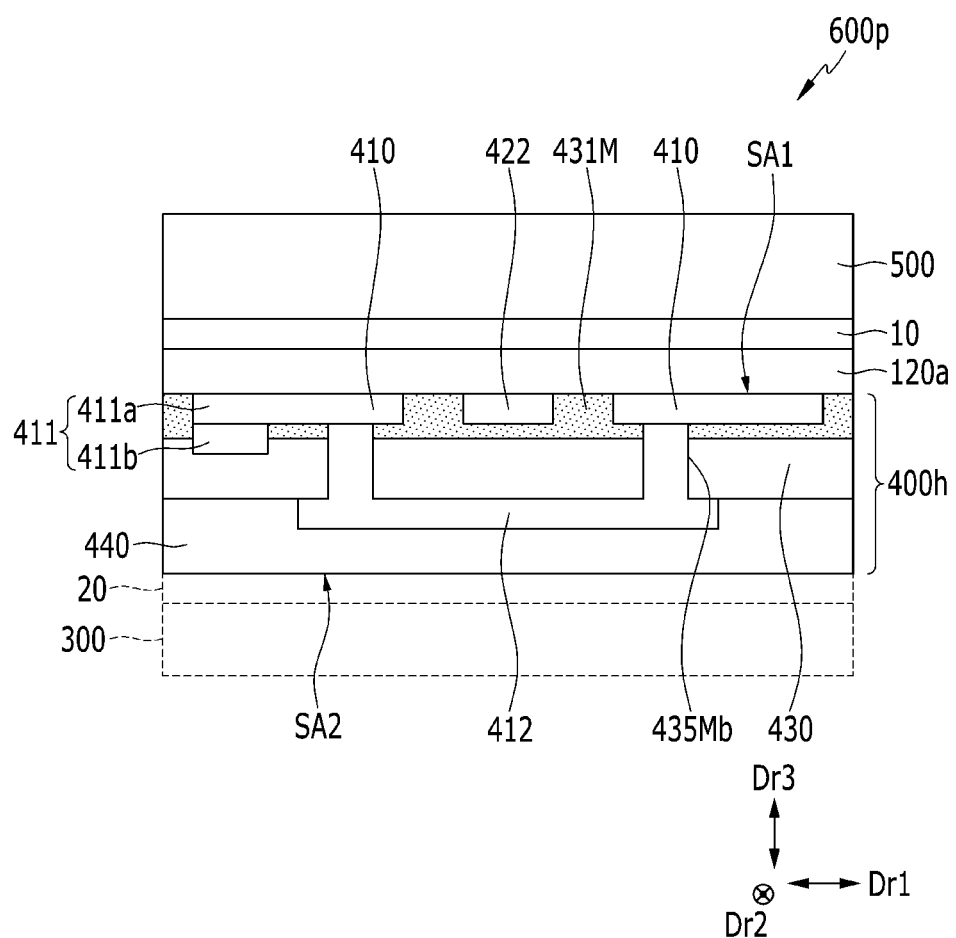

Referring to FIG. 23, an optical touch film 600p is substantially the same as the optical touch film 600o;

however, instead of sensor layer 400h including the high refractive insulating layer 430M, the sensor layer 400h includes the high refractive insulating layer 431M and the first insulating layer 430 disposed between the first connection part 412 and the first touch electrodes 410 and the second touch electrodes 420. The high refractive insulating layer 431M may be disposed between the first insulating layer 430 and the first touch electrodes 410 and the second touch electrodes 420 to contact the first touch electrodes 410 and the second touch electrodes 420. In this manner, contacts 435Mb may be formed in the high refractive insulating layer 431M and the first insulating layer 430 to exposed portions of the first touch electrodes 410.

Figure 24:
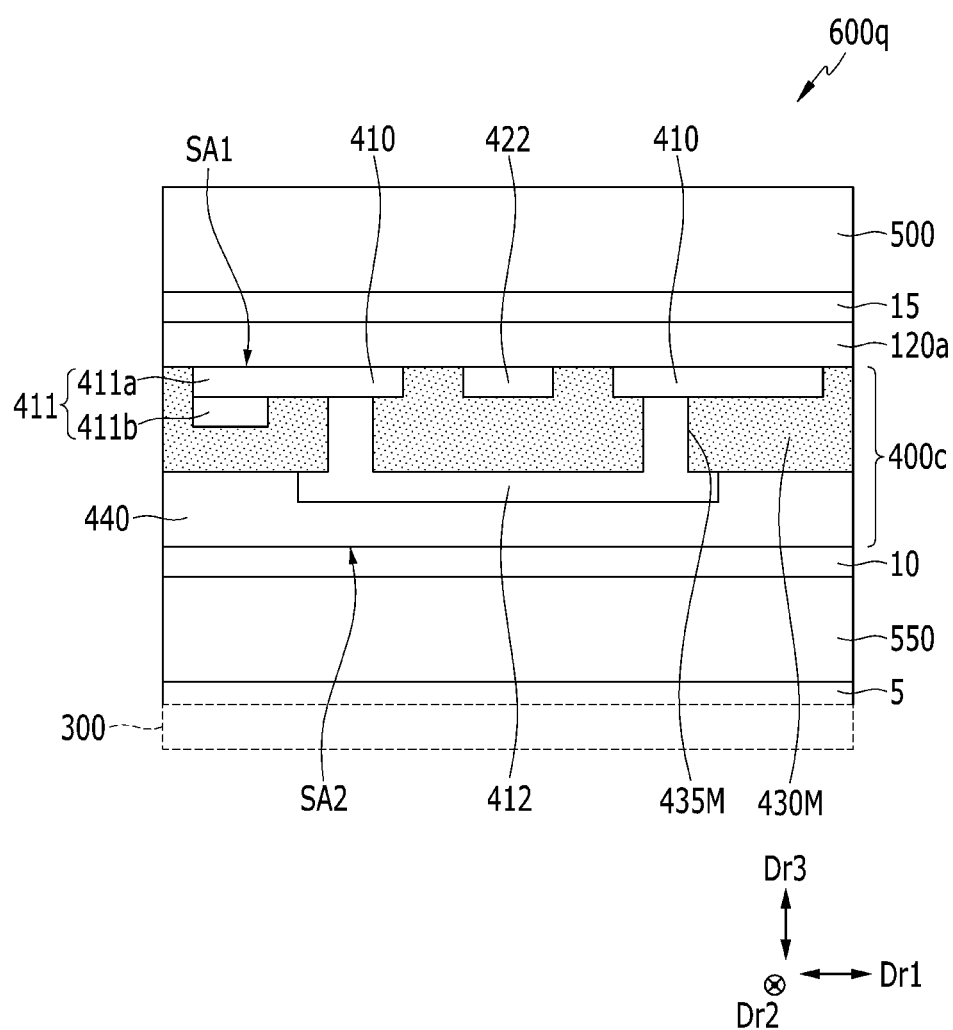

Referring to FIG. 24, an optical touch film 600q is substantially the same as the optical touch film 600o; however, the optical touch film 600q may include the sensor layer 400c in a different orientation, e.g., the first surface SA1 may be disposed further from the display panel 300 than the second surface SA2. Further, the optical touch film 600q may include the optical film 550 disposed between the display panel 300 and the sensor layer 400c. The adhesive layer 5 may be disposed between the optical film 550 and the display panel 300. The adhesive layer 10 may be disposed between the optical film 550 and the sensor layer 400c. The optical film 550 may be an isotropic film. In addition, the adhesive layer 15, instead of the adhesive layer 10, may be disposed between the optical film 500 and the sensor layer 400c.

Figure 25:
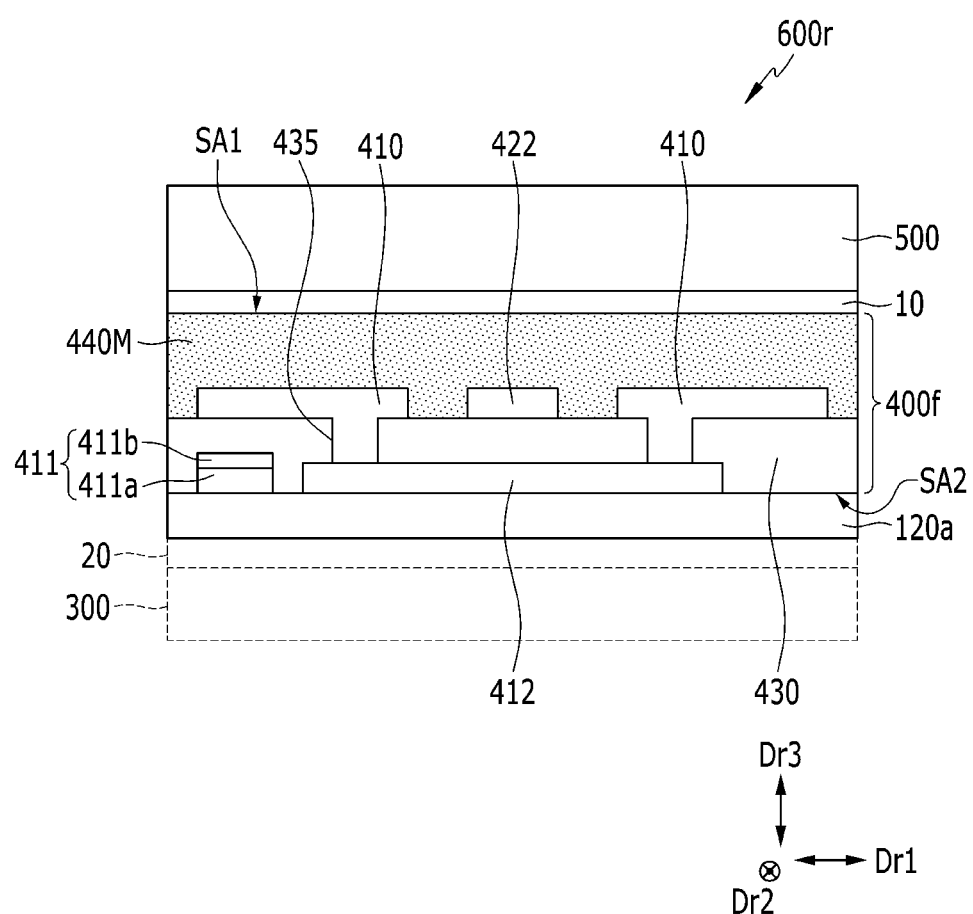

Referring to FIG. 25, an optical touch film 600r is substantially the same as the optical touch film 600l; however, the adhesive layer 20, instead of the adhesive layer 10, may be disposed between the display panel 300 and the separation layer 120a. In addition, the adhesive layer 10, instead of the adhesive layer 15, may be disposed between the sensor layer 400f and the optical film 500.

Figure 26:
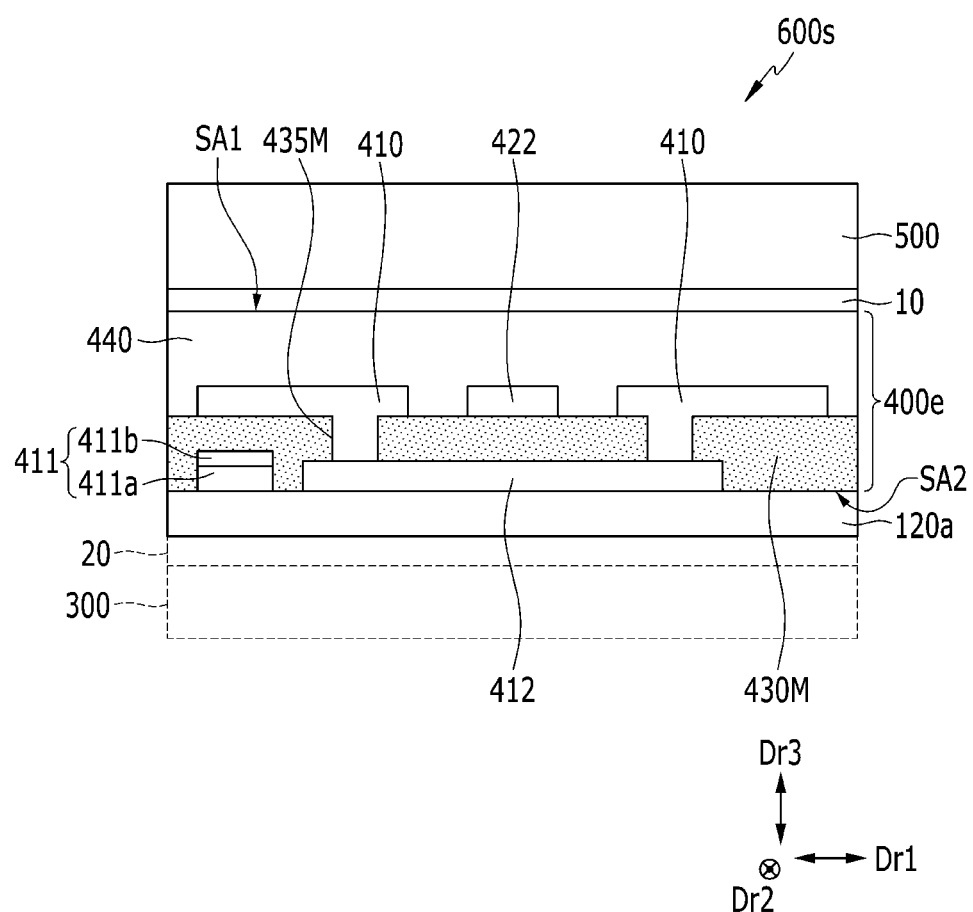

Referring to FIG. 26, an optical touch film 600s is substantially the same as the optical touch film 600k; however, the optical touch film 600s may include the adhesive layer 20, instead of the adhesive layer 10, disposed between the display panel 300 and the separation layer 120a. In addition, the adhesive layer 10, instead of the adhesive layer 15, may be disposed between the sensor layer 400e and the optical film 500.

Figure 27:
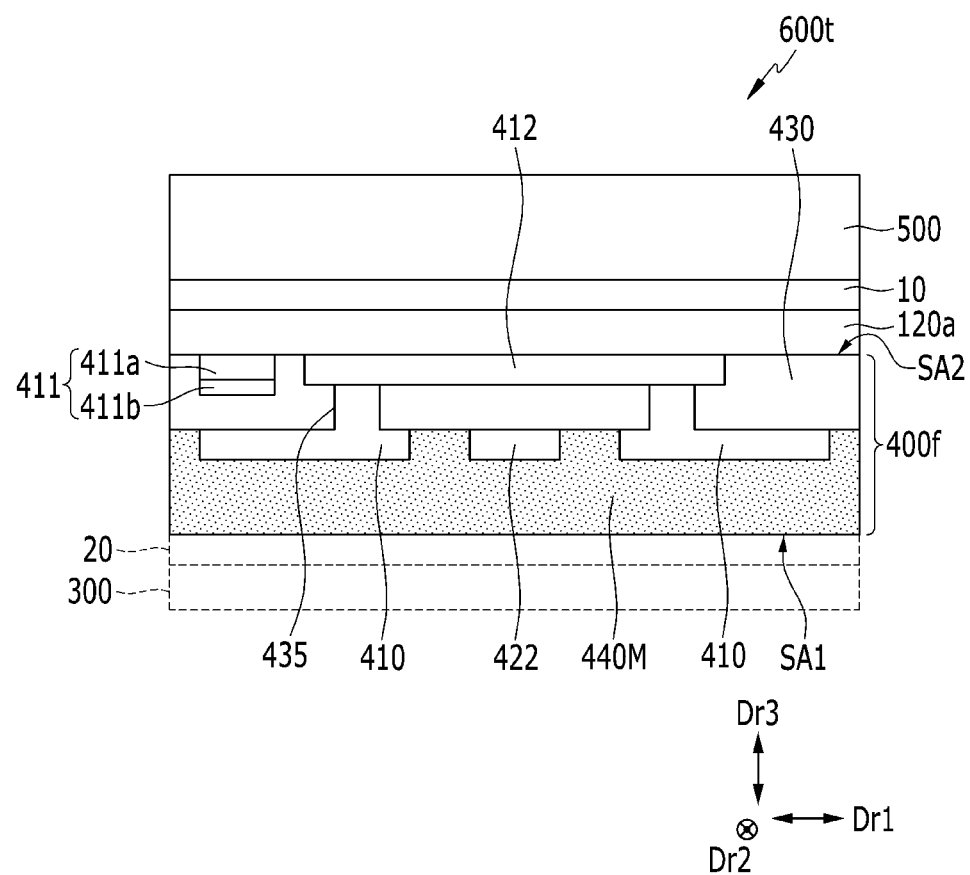

Referring to FIG. 27, an optical touch film 600t is similar to the optical touch film 600r; however, the sensor layer 400f may have an alternative orientation. That is, the top and bottom positions of the first surface SA1 and the second surface SA2 may be changed. For instance, the first connection part 412, the first touch wires 411, and the second touch wires 421 may be disposed below the separation layer 120a; the first insulating layer 430 may be disposed below the first connection part 412, the first touch wires 411, and the second touch wires 421; and the first touch electrodes 410 and the second touch electrodes 420 may be disposed below the first insulating layer 430. The first touch wires 411 and the second touch wires 421 may include a first conductive layer 411a and a second conductive layer 411b. The first conductive layer 411a may be disposed in a same layer as the first connection part 412 and may include a same material as the first connection part 412. The second conductive layer 411b may be disposed below the first conductive layer 411a and may include a low resistance material, such as a metal. The high refractive insulating layer 440M may be disposed below the first touch electrodes 410, the second touch electrodes 420, and the second connection part 422. The high refractive insulating layer 440M may be in contact with the first touch electrodes 410 and the second touch electrodes 420.

Figure 28:
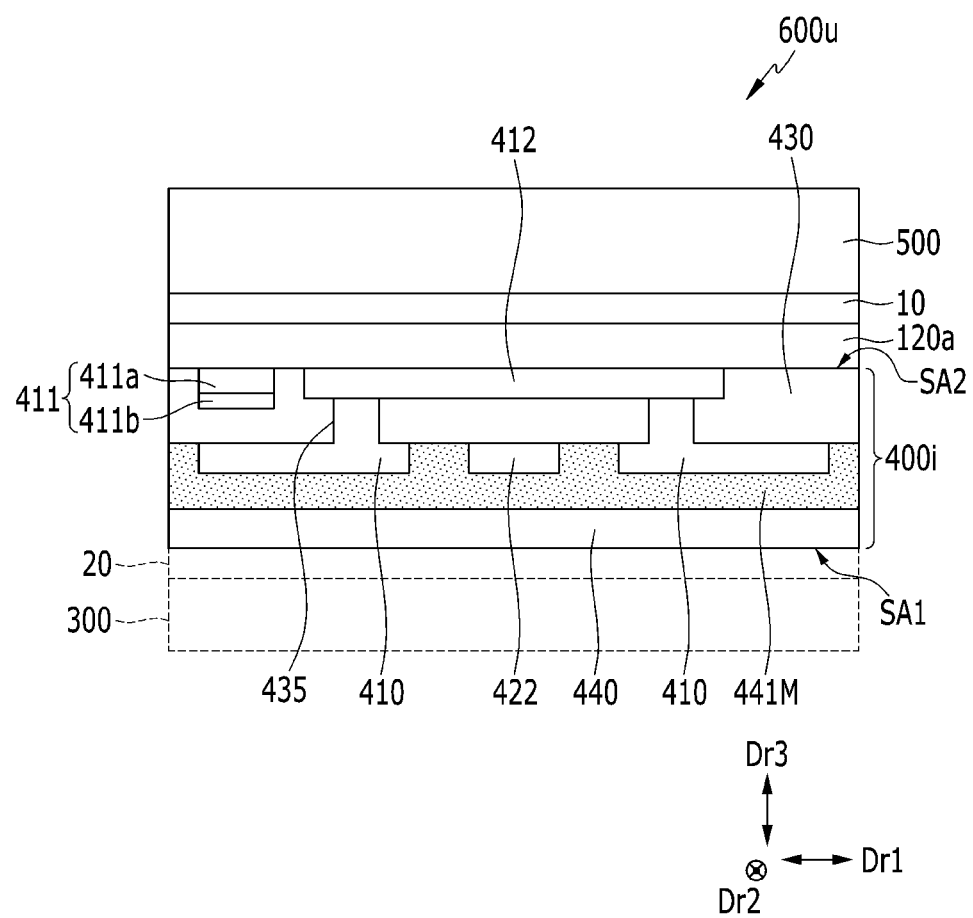

Referring to FIG. 28, an optical touch film 600u is almost the same as the optical touch film 600t; however, the optical touch film 600u may include a sensor layer 400i, and may include the high refractive insulating layer 441M and the second insulating layer 440 disposed below the first touch electrodes 410 and the second touch electrodes 420. The high refractive insulating layer 441M may be disposed between the second insulating layer 440 and the first touch electrodes 410 and the second touch electrodes 420.

Figure 29:
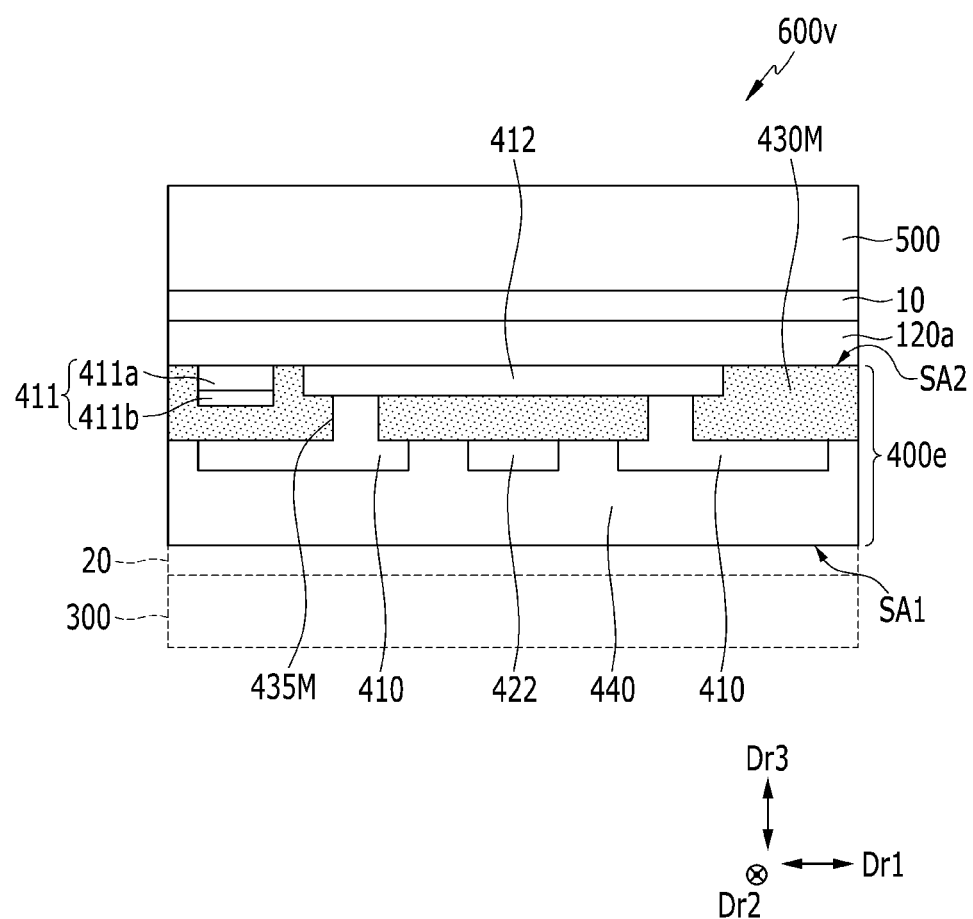

Referring to FIG. 29, an optical touch film 600v is similar to the optical touch film 600t; however, the optical touch film 600v may include the sensor layer 400e of FIG. 18 in a different orientation, e.g., the second surface SA2 may be disposed further from the display panel 300 than the first surface SA1. To this end, the optical touch film 600v may include the high refractive insulating layer 430M, instead of the high refractive insulating layer 440M. The high refractive insulating layer 430M may be disposed between the first connection part 412 and the second connection part 422, the first touch electrodes 410, and the second touch electrodes 420. The high refractive insulating layer 430M may contact the first touch electrodes 410 and the second touch electrodes 420.

Figure 30:
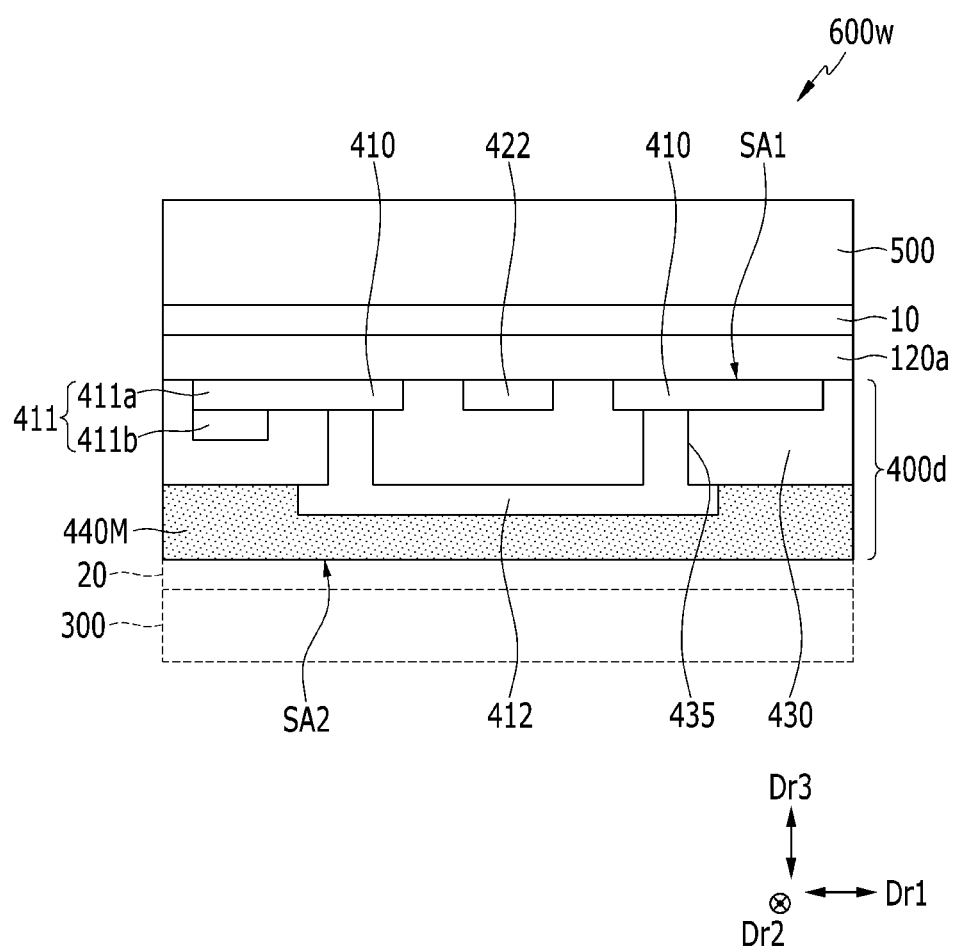

Referring to FIG. 30, an optical touch film 600w is substantially the same as the optical touch film 600n; however, the optical touch film 600w may include the sensor layer 400d in a different orientation, e.g., the first surface SA1 may be disposed further from the display panel 300 than the second surface SA2. To this end, the optical touch film 600w may include the high refractive insulating layer 440M instead of the high refractive insulating layer 450M. The high refractive insulating layer 440M may be disposed below the first connection part 412.

Figure 31:
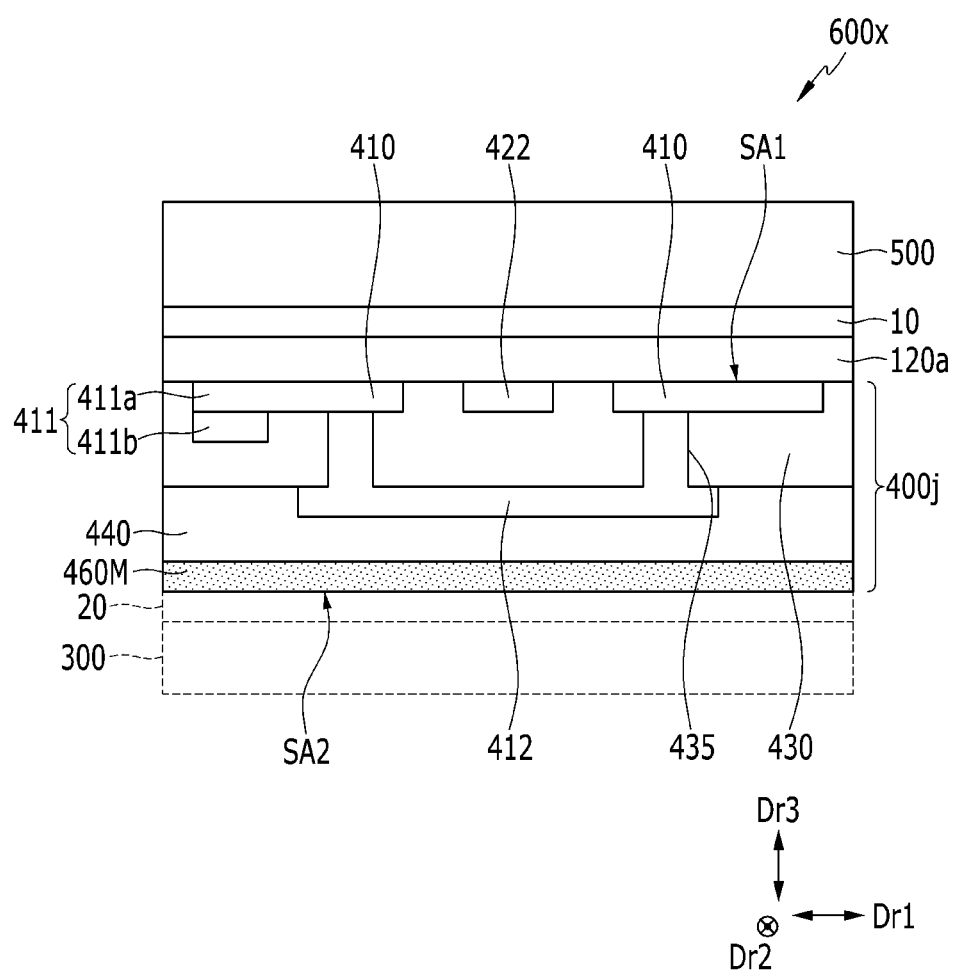

Referring to FIG. 31, an optical touch film 600x is similar to the optical touch film 600w; however, the sensor layer 400j may include the high refractive insulating layer 460M, instead of the high refractive insulating layer 440M. The second insulating layer 440 may be disposed below the first connection part 412, and the high refractive insulating layer 460M may be disposed below the second insulating layer 440.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:
1. An optical touch film comprising:
  a sensor layer comprising touch electrodes forming a sensor;
  an optical film;
  a curing-type adhesive layer between the sensor layer and the optical film;
  a separation layer on a surface of the sensor layer, the separation layer comprising an organic polymer material; and
  a refractive insulating layer at a layer contacting the touch electrodes,
  wherein:
    a refractive index of the refractive insulating layer is greater than a refractive index of the separation layer; and the separation layer is adjacent to and in contact with the curing-type adhesive layer.

2. The optical touch film of claim 1, wherein the sensor layer comprises the refractive insulating layer.

3. The optical touch film of claim 2, wherein:
the sensor layer further comprises a connection part connecting two adjacent touch electrodes among the touch electrodes, the connection part being at a different layer than the touch electrodes; and
the refractive insulating layer is between the touch electrodes and the connection part, the refractive insulating layer comprising a contact hole through which the connection part connects the two adjacent touch electrodes.

4. The optical touch film of claim 2, wherein the refractive insulating layer is between the touch electrodes and the curing-type adhesive layer.

5. The optical touch film of claim 4, wherein the separation layer is between the refractive insulating layer and the curing-type adhesive layer.

6. The optical touch film of claim 2, wherein:
the sensor layer further comprises:
a connection part connecting two adjacent touch electrodes among the touch electrodes, the connection part being at a layer different than the touch electrodes; and
a first insulating layer between the touch electrodes and the connection part; and
the touch electrodes are at a layer between the refractive insulating layer and the first insulating layer.

7. The optical touch film of claim 6, wherein the connection part contacts the separation layer.

8. The optical touch film of claim 7, wherein the separation layer is between the curing-type adhesive layer and the connection part.

9. The optical touch film of claim 6, further comprising:
a second insulating layer contacting the refractive insulating layer,
wherein the refractive insulating layer is at a layer between the second insulating layer and the touch electrodes.

10. The optical touch film of claim 2, wherein the refractive insulating layer comprises an organic material.

11. The optical touch film of claim 10, wherein the refractive insulating layer further comprises nanoparticles.

12. The optical touch film of claim 1, wherein the refractive index of the refractive insulating layer is closer to a refractive index of the touch electrodes than is the refractive index of the separation layer.

13. The optical touch film of claim 1, wherein the refractive index of the refractive insulating layer is in a range from 1.6 to 2.0.

14. A display device comprising
a display panel; and
an optical touch film,
wherein the optical touch film comprises:
a sensor layer comprising touch electrodes forming a sensor;
an optical film;
a curing-type adhesive layer between the sensor layer and the optical film;
a separation layer on a surface of the sensor layer, the separation layer comprising an organic polymer material; and
a refractive insulating layer at a layer contacting the touch electrodes, and wherein:
a refractive index of the refractive insulating layer is greater than a refractive index of the separation layer; and
the separation layer is adjacent to and in contact with the curing-type adhesive layer.

15. The display device of claim 14, wherein the sensor layer comprises the refractive insulating layer.

16. The display device of claim 15, wherein:
the sensor layer further comprises a connection part connecting two adjacent touch electrodes among the touch electrodes, the connection part being at a different layer than the touch electrodes; and
the refractive insulating layer is between the touch electrodes and the connection part, the refractive insulating layer comprising a contact hole through which the connection part connects the two adjacent touch electrodes.

17. The display device of claim 15, wherein the refractive insulating layer is between the touch electrodes and the curing-type adhesive layer.

18. The display device of claim 17, wherein the separation layer is between the refractive insulating layer and the curing-type adhesive layer.

19. The display device of claim 15, wherein:
the sensor layer further comprises:
a connection part connecting two adjacent touch electrodes among the touch electrodes, the connection part being at a layer different than the touch electrodes; and
a first insulating layer between the touch electrodes and the connection part; and
the touch electrodes are at a layer between the refractive insulating layer and the first insulating layer.

20. The display device of claim 19, wherein the connection part contacts the separation layer.

21. The display device of claim 20, wherein the separation layer is between the curing-type adhesive layer and the connection part.

22. The display device of claim 19, further comprising:
a second insulating layer contacting the refractive insulating layer,
wherein the refractive insulating layer is at a layer between the second insulating layer and the touch electrodes.

23. The display device of claim 14, wherein the refractive insulating layer comprises an organic material.

24. The display device of claim 23, wherein the refractive insulating layer further comprises nanoparticles.

25. The display device of claim 14, wherein the sensor layer is between the display panel and the optical film.

26. The display device of claim 14, wherein the refractive index of the refractive insulating layer is closer to a refractive index of the touch electrodes than is the refractive index of the separation layer.

27. The display device of claim 14, wherein the refractive index of the refractive insulating layer is in a range from 1.6 to 2.0.

28. A method of manufacturing a display device, the method comprising:
coating a separation layer comprising an organic polymer material on a carrier substrate;
forming a sensor layer on the separation layer, the sensor layer comprising:
touch electrodes; and a refractive insulating layer contacting the touch electrodes, a refractive index of the refractive insulating layer is greater than a refractive index of the separation layer;

separating the sensor layer and at least some of the separation layer from the carrier substrate such that the carrier substrate is removed; and curing an adhesive layer between the sensor layer and an optical film.

29. The method of claim 28, wherein the refractive insulating layer is between the touch electrodes and the adhesive layer.

30. The method of claim 28, wherein the separation layer is adjacent to and in contact with the adhesive layer.

31. An optical touch film comprising:

a sensor layer comprising touch electrodes forming a sensor;

an optical film on the sensor layer;

an adhesive layer between the sensor layer and the optical film;

a separation layer on a surface of the sensor layer, the separation layer comprising an organic polymer material;

a pressure-sensitive adhesive layer contacting the separation layer; and a refractive insulating layer on the touch electrodes, wherein a refractive index of the refractive insulating layer is greater than a refractive index of the separation layer.

32. The optical touch film of claim 31, wherein the separation layer is disposed between the pressure-sensitive adhesive layer and the sensor layer.

33. The optical touch film of claim 32, wherein:

the adhesive layer is disposed at a first side of the sensor layer; and the separation layer is disposed at a second side of the sensor layer, the second side opposing the first side.

* * * * *